(12) United States Patent
Nishioka et al.

(10) Patent No.: US 6,626,532 B1
(45) Date of Patent: Sep. 30, 2003

(54) VARI-FOCAL SPECTACLES

(75) Inventors: Kimihiko Nishioka, Hachioji (JP); Koji Ishizaki, Hachioji (JP); Masahiro Kaburaki, Iruma (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/092,651

(22) Filed: Jun. 9, 1998

(30) Foreign Application Priority Data

Jun. 10, 1997 (JP) .............................. 9-151771
Mar. 25, 1998 (JP) ........................... 10-077042
Mar. 5, 1998 (JP) ........................... 10-053029

(51) Int. Cl.[7] ............................... G02C 1/00
(52) U.S. Cl. ......................... 351/41; 351/49
(58) Field of Search .................. 351/41, 49, 158; 349/13

(56) References Cited

U.S. PATENT DOCUMENTS 5,654,786 A * 8/1997 Bylander .................. 351/49

FOREIGN PATENT DOCUMENTS

| JP | 1-306164 | 12/1989 |
| JP | 2-46423 A | 2/1990 |
| JP | 5-34656 A | 8/1991 |
| JP | 4-345124 A | 12/1992 |
| JP | 08192347 A | 7/1996 |
| JP | HEI9-243806 | 9/1997 |

OTHER PUBLICATIONS

Wilson, et al, "Transmission variation using scattering/transparent switching films", Elsevier Science Publishers B.V., 1993, pp. 197–214.
Makai, "Minor Planents will come in Twanami Science Library 8", 1994, pp. 58–63 & 118–119. See Appln. p. 25.
Monthly Report of Japanese Chemical Association, 1997, pp. 14–18.

* cited by examiner

*Primary Examiner*—Hung Xuan Dang
(74) *Attorney, Agent, or Firm*—Pillsbury Winthrop LLP

(57) ABSTRACT

Optical elements such as a vari-focal lens element, a vari-focal diffractive optical element and a variable declination prism usable as spectacle lens elements and so on.

18 Claims, 27 Drawing Sheets

VARI-FOCAL SPECTACLES

BACKGROUND OF THE INVENTION a) Field of the Invention

The present invention relates to optical elements such as a vari-focal lens element, a vari-focal diffractive optical element and a variable declination prism which are to be used as liquid crystal optical elements. The present invention also relates to an electronic image pickup unit which uses these optical elements.

b) Description of the Prior Art

For composing a vari-focal lens system of lens elements which are manufactured by polishing a glass material, it is conventional to change a focal length of the lens system by moving a lens unit(s) in a direction along an optical axis, for example, as in a zoom lens system for cameras since the lens elements cannot change focal lengths by themselves. However, such a lens system has a drawback that it has a complicated mechanical structure.

For correcting such a drawback, there has been proposed an optical system which uses a polarizing plate 1 and a liquid crystal lens component 2, for example, as shown in FIG. 1. The liquid crystal lens component 2 comprises lens elements 3a and 3b, and a liquid crystal layer 5 which is disposed between these lens elements by way of transparent electrodes 4a and 4b, and an AC power source 7 is connected between the transparent electrodes 4a and 4b by way of a switch 6, whereby the optical system is configured to change a refractive index of the liquid crystal layer 5 by selectively applying an electric field to the liquid crystal layer 5.

When natural light, for example, is incident on the polarizing plate 1 of this optical system, only a predetermined linearly polarized component transmits through the polarizing plate 1 and is incident on the liquid crystal lens component 2. In a condition where the switch 6 is turned off and no electric field is applied to the liquid crystal layer 5 as shown in FIG. 1, longer axes of liquid crystal molecules 5a are oriented in a direction of a plane of polarization of the incident linearly polarized component, whereby a refractive index of the liquid crystal layer 5 is enhanced and a focal length of the liquid crystal lens component 2 is shortened. In a condition where the switch 6 is turned on and an electric field is applied to the liquid crystal layer 5 as shown in FIG. 2, in contrast, the longer axes of the liquid crystal molecules 5a are oriented in parallel with an optical axis, whereby the refractive index of the liquid crystal layer 5 is lowered and the focal length of the liquid crystal lens component 2 is prolonged. The focal length of the optical system shown in FIG. 1 is variable by selectively applying an electric field in the liquid crystal lens component 2 as described above.

However, the optical system shown in FIG. 1 poses a problem that it attenuates rays to be incident on the liquid crystal lens component 2 during transmission through the polarizing plate 1 and lowers a light utilization efficiency since it requires to dispose the polarizing plate 1 before the liquid crystal lens component 2 so that only the predetermined linearly polarized component is incident on the liquid crystal lens component 2. Further, the optical system which utilizes light at such a low efficiency poses another problem that it is applicable only to limited instruments or has a low versatility.

Further, an electronic image pickup unit for electronic cameras, video cameras and the like consists of a combination of an image pickup device 8 and a lens system 9 as shown in FIG. 3.

Such an electronic image pickup unit generally uses a lens system which has a relatively complicated composition, has a complicated configuration as a whole, comprises a large number of parts and requires tedious assembly, thereby being limited in compact design and reduction of a manufacturing cost thereof.

SUMMARY OF THE INVENTION

In view of the conventional problems described above, a primary object of the present invention is to provide optical elements having variable optical characteristics, i.e., a vari-focal optical element, a vari-focal diffractive optical element, a vari-focal mirror and a variable declination prism usable as liquid crystal optical elements which are adequately configured so as to enhance light utilization efficiencies, be applicable efficiently to various kinds of optical instruments and has excellent versatility.

The vari-focal optical element according to the present invention is characterized in that it comprises: a first optical member which has first and second surfaces, and allows incident rays to transmit through the first and second surfaces; a second optical member having a third surface which receives rays having transmitted through the first optical member; a lens surface which is formed on at least one of the first, second and third surfaces; a pair of transparent electrodes disposed on the second surface and the third surface respectively; and a polymer dispersive liquid crystal layer which is disposed between these transparent electrodes, and that it is configured so as to be capable of changing a focused point of rays which have transmitted through the first and second optical members or rays which have transmitted through the first optical member, have been reflected by the third surface and have transmitted again through the first optical member by applying an electric field to the polymer dispersive liquid crystal layer by way of the pair of transparent electrodes.

Further, the vari-focal diffractive optical element according to the present invention is characterized in that it comprises: a first optical member which has first and second surfaces, and allows incident rays to transmit through the first and second surfaces; a second optical member which has third and fourth surfaces, and allows rays which have transmitted through the first optical member to emerge through the third and fourth surfaces; a diffractive surface which is formed at least one of the first, second and third surfaces; transparent electrodes which are disposed on sides of the second surface and the third surface respectively; and a polymer dispersive liquid crystal layer which is disposed between these transparent electrodes, and that it is configured so as to be capable of changing a focused point of rays which have transmitted through the first and second optical elements by applying an electric field to the polymer dispersive liquid crystal layer by way of the pair of transparent electrodes.

Furthermore, the variable declination prism according to the present invention is characterized in that it comprises: a first optical member which has first and second surfaces, and allows incident rays to transmit through the first and second surfaces; a second optical member having third and fourth surfaces, and allows rays which have transmitted through the first optical member to pass through the third and fourth surfaces; an inclined surface which is formed on at least one of the first, second and third surfaces; transparent electrodes which are disposed on sides of the second surface and the third surface respectively; and a polymer dispersive liquid crystal layer which is disposed between these transparent electrodes, and that it is configured so as to be capable of changing declinations of rays which have transmitted through the first and second optical members by applying an electric field to the polymer dispersive liquid crystal layer by way of the pair of transparent electrodes.

BRIEF DESCRIPTION OF THE DRAWINGS

FIG. 19 shows a perspective view illustrating an overall configuration of the vari-focal spectacles according to the present invention including the driving unit and so on;

DETAILED DESCRIPTION OF THE PREFERRED EMBODIMENTS

Figure 4:
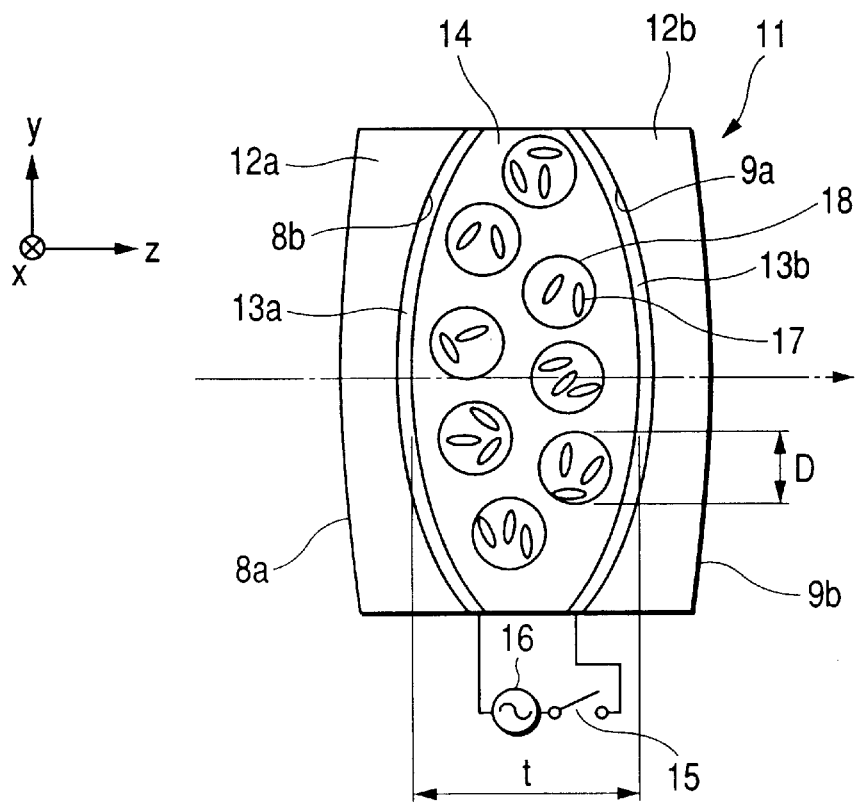
FIG. 4 shows a sectional view illustrating a theoretical composition of the vari-focal lens component according to the present invention.

FIG. 4 is a sectional view illustrating a theoretical composition of the vari-focal lens component according to the present invention. A vari-focal lens component 11 comprises, in order from a side of incidence of rays, a first lens element 12a which has first and second surfaces 8a and 8b, a second lens element 12b which has third and fourth surfaces 9a and 9b, and a polymer dispersive liquid crystal layer 14 which is disposed between these lens elements by way of transparent electrodes 13a and 13b: the vari-focal lens element functioning to converge incident rays with the first and second lens elements 12a and 12b. The transparent electrodes 13a and 13b are connected to an AC power source 16 by way of a switch 15 so as to apply an AC electric field selectively to the polymer dispersive liquid crystal layer 14. The polymer dispersive liquid crystal layer 14 comprises a large number of minute polymer cells 18 which have optional forms such as spheres and polyhedrons, contain liquid crystal molecules respectively, and has a volume which is made coincident with a sum of volumes occupied by polymers and liquid crystal molecules 17 composing the polymer cells 18.

When the polymer cells 18 are spherical, for example, they are composed so as to satisfy, for example, the following condition (1):

$$2 \text{ nm} \leq D \leq \lambda/5 \tag{1}$$

wherein the reference symbol D represents a mean diameter of the polymer cells 18 and the reference symbol λ designates a wavelength of light used.

Since the liquid crystal molecules 17 have sizes on the order of 2 nm or larger, the condition (1) defines a lower limit of the mean diameter D as 2 nm or larger. An upper limit of D is dependent on a thickness t of the polymer liquid crystal layer 14 as measured in the direction along an optical axis of the vari-focal lens component 11. When D is large as compared with λ, however, rays are scattered by border surfaces of the polymer cells 18 due to a difference between a refractive index of the polymers and that of the liquid crystal molecules 17 and the polymer dispersive liquid crystal layer 14 is opaque. It is therefore desirable that D has a value not exceeding λ/5. When an optical instrument which is to use the vari-focal lens component does not require so high precision, it is sufficient that D has a value of x or smaller. In other words, it is sufficient that D satisfies the following condition (1-1):

$$2 \text{ nm} \leq D \leq \lambda \tag{1-1}$$

Transparency of the polymer dispersive liquid crystal layer 14 is lower as the thickness t becomes larger.

Figure 5:
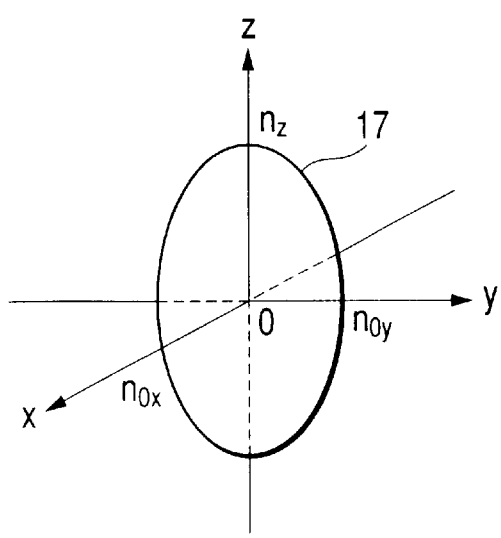
FIG. 5 shows a diagram illustrating an optical indicatrix of a uniaxial nematic liquid crystal molecule.

Uniaxial nematic liquid crystal molecules, for example are used as the liquid crystal molecules 17 though it is possible to use various kinds of liquid crystals such as nematic liquid crystals, ferroelectric liquid crystals, choresteric liquid crystals, discotie liquid crystals, diselectric liquid crystals and tolane liquid crystals. The liquid crystal molecule 17 has an optical indicatrix having such a shape as that shown in FIG. 5 to which the following formula (2) applies:

$$n_{0x} = n_{0y} = n_0 \tag{2}$$

wherein the reference symbol $n_0$ represents a refractive index of the ordinary rays, and the reference symbols $n_{0x}$ and $n_{0y}$ designate refractive indices in directions perpendicular to each other in a plane including the ordinary rays.

Figure 6:
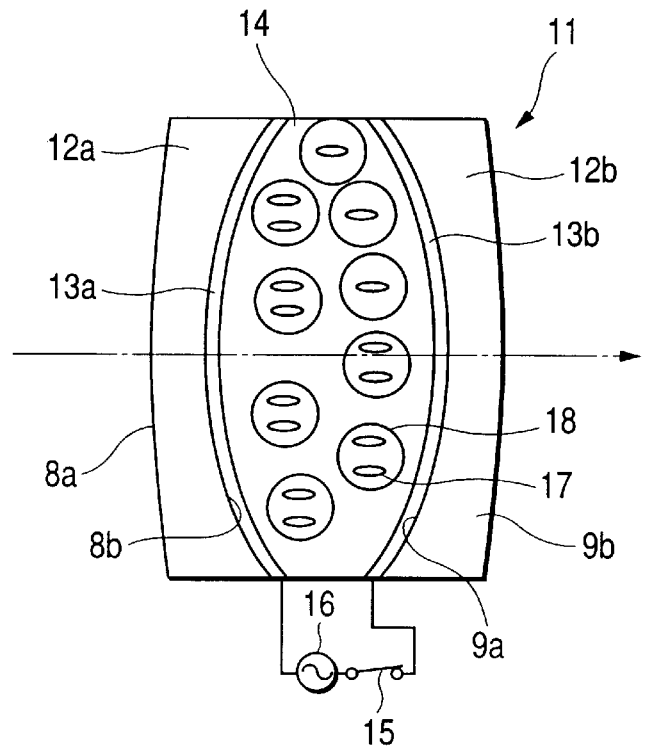
FIG. 6 shows a sectional view illustrating a condition where an electric field is applied to a polymer dispersive liquid crystal layer of the vari-focal lens component shown in FIG. 4.

In a condition where the switch 15 is turned off as shown in FIG. 4, i.e., an electric field is not applied to the polymer dispersive liquid crystal layer 14, the liquid crystal molecules 17 are set in various directions, whereby the polymer dispersive liquid crystal layer 14 has a high refractive index for incident rays and the vari-focal lens component 11 functions as a lens component having a strong refractive power. When an electric field is applied to the polymer dispersive liquid crystal layer 14 by turning on the switch 15 as shown in FIG. 6, the liquid crystal molecules 17 are oriented so that longer axes of the optical indicatrices are in parallel with the optical axis of the vari-focal lens component 11, whereby the polymer dispersive liquid crystal layer 14 has a low refractive index and the vari-focal lens component 11 functions as a lens having a weak refractive power.

Figure 7:
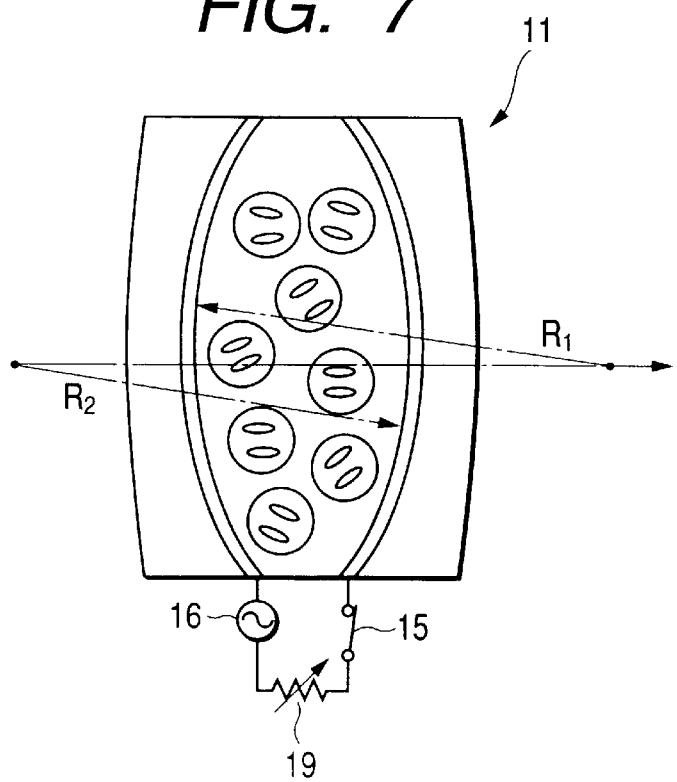
FIG. 7 shows a sectional view illustrating a composition to vary a voltage applied to polymer dispersive layer of the vari-focal lens component shown in FIG. 1.

A voltage applied to the polymer dispersive liquid crystal layer 14 can be varied stepwise or continuously as shown in FIG. 7, for example, with a variable resistor 19. By varying the voltage as described above, it is possible to vary a refractive power stepwise or continuously since the liquid crystal molecules 17 are oriented so that the longer axes of the indicatrices are progressively in parallel with the optical axis of the vari-focal lens component 11 as the applied voltage becomes higher.

In the condition shown in FIG. 4 where an electric field is not applied o the polymer dispersive liquid crystal layer 14, a mean refractive index $n_{LC}'$ of the liquid crystal molecules 17 is approximately expressed by the following equation (3):

$$(n_{0x}+n_{0y}+n_z)/3 \equiv n_{LC}' \tag{3}$$

wherein the reference symbol $n_z$ represents a refractive index in the direction of the longer axis of the optical indicatrix shown in FIG. 4.

When the equation (2) mentioned above is applicable and $n_z$ is represented as a refractive index $n_e$ of an extraordinary ray, a mean refractive index $n_{LC}$ is given by the following formula (4):

$$(2n_0+n_e)/3n_{LC} \tag{4}$$

In this case, Maxwell-Garnett's law gives a refractive index $n_A$ of the polymer dispersive liquid crystal layer 14 by the following equation (5):

$$n_A = f\!f n_{LC}' + (1-f\!f)n_P \tag{5}$$

wherein the reference symbol $n_P$ represents a refractive index of the polymers which compose the polymer cells 18 and the reference symbol ff designates ratio of a volume of the liquid crystal molecules 17 to a volume of the polymer dispersive liquid crystal layer 14.

Accordingly, a focal length $f_1$ of the vari-focal lens component 11 is given by the following equation (6):

$$1/f_1 = (n_A-1)(1/R_1-1/R_2) \tag{6}$$

wherein the reference symbols $R_1$ and $R_2$ represent radii of curvature on inside surfaces of the lens elements 12a and 12b respectively, i.e., on surfaces thereof which are located on a side of the polymer dispersive liquid crystal layer 14. $R_1$ and $R_2$ are taken as positive when a center of curvature is located on a side of an imaging point. Further, refraction by outside surfaces of the lens elements 12a and 12b are not of consideration. That is, a focal length of the vari-focal lens component which is composed only of the polymer dispersive liquid crystal layer 14 is given by the equation (6).

When a mean refractive index $n_0'$ for the ordinary ray is expressed by a formula (7) shown below, a refractive index $n_B$ of the polymer dispersive liquid crystal layer 14 in the condition shown in FIG. 6 where the electric field is applied to the polymer dispersive liquid crystal layer 14 is given by the following equation (8):

$$n_0' = (n_{0x}+n_{0y})/2 \tag{7}$$

$$n_B = f\!f n_0' + (1-f\!f)n_P \tag{8}$$

In this case, a focal length $f_2$ of the vari-focal lens component which is composed only of the polymer dispersive liquid crystal layer 14 is given by the following equation (9):

$$1/f_2 = (n_B-1)(R_1-1/R_2) \tag{9}$$

When a voltage which is lower than that in FIG. 6 is applied to the polymer dispersive liquid crystal layer 14, the vari-focal lens component 11 has a focal length which is between the focal length $f_1$ given by the equation (6) and the focal length $f_2$ given by the equation (9).

From the equations (6) and (9) described above, the polymer dispersive liquid crystal layer 14 varies a focal length at a ratio given by the following equation (10):

$$|(f_2-f_1)/f_2| = |(n_B-n_A)/(n_B-1)| \tag{10}$$

This variation ratio $|(f_2-f_1)/f_2|$ can therefore be enhanced by increasing $|n_B-n_A|$. $n_B-n_A$ is given by the following equation (11):

$$n_B-n_A = f\!f(n_0'-n_{LC}') \tag{11}$$

It is therefore possible to enhance the variation ratio by enlarging $|n_0'-n_{LC}'|$. Since $n_B$ for practical use is on the order of 1.3 to 2, it is sufficient that $|n_0'-n_{LC}'|$ has a value within a range defined by the following condition (12):

$$0.01 \leq |n_0'-n_{LC}'| \leq 10 \tag{12}$$

As far as $|n_0'-n_{LC}'|$ has a value within the range defined by the condition (12), it is possible to vary a focal length at 0.5% or a higher ratio with the polymer dispersive liquid crystal layer 14, thereby obtaining an effective vari-focal lens component. Due to a restriction imposed on liquid crystal substances, $|n_0'-n_{LC}'|$ cannot have a value exceeding 10.

Now, description will be made of a basis of the upper limit of the condition (1).

Variations of transmittance τ caused by varying sizes of polymer liquid crystals are described in "Transmission variation using scattering/transparent switching films" of "Solar Energy Materials and Solar Cells", Vol 31, Wilson and Eck. 1993, Eleevier Science Publishers B.v., pp 197–214. Representing a radius of a polymer liquid crystal by r, and assuming t=300 μm, ff=0.5, $n_P$=1.45, $n_{LC}$=1.585 and λ=500 nm, FIG. 6 on page 206 of this literature shows a fact that transmittance τ has theoretical values of τ≈90% at r=5 nm (D=λ/50, D·t=λ·6 μm (D and λ in nm also applying to the following)) and τ≈50% at r=25 nm (D=λ/10).

On an assumption that transmittance τ varies according to an exponential function of t, transmittance τ at t=150 μm is presumed as τ≈71% at r=25 nm (D=λ/10, D·t=λ·15 μm). Similarly transmittance τ at t=75 μm is presumed as τ≈80% at r=25 nm (D=λ/10, D·t=λ·7.5 μm).

On the basis of these results, r is 70% to 80% or higher and a vari-focal lens component can sufficiently be put to practical use when it satisfies a condition (13) shown below. At t=75 μm, for example, sufficient transmittance can be obtained at D≦λ/5 μm:

$$D \cdot t \leq \lambda \cdot 15 \text{ μm} \tag{13}$$

Transmittance of the polymer dispersive liquid crystal layer 14 is higher as $n_P$ has a value which is closer to a value of $n_{LC}'$. When $n_0'$ and $n_P$ have values different from each other, on the other hand, transmittance of the polymer dispersive liquid crystal layer 14 is lowered. As a mean value of transmittance in the condition shown in FIG. 4 and that in the condition shown in FIG. 6, the polymer dispersive liquid crystal layer 14 has high transmittance when it satisfies the following equation (14):

$$n_P = (n_0' + n_{LC}')/2 \quad (14)$$

Since the vari-focal lens component 11 is used as a lens, it is desirable that it has transmittance which remain substantially unchanged between the condition shown in FIG. 4 and that shown in FIG. 6, and is as high as possible. Though polymer materials which are available for composing the polymer cells 18 and materials for the liquid crystal molecules 17 are limited, it is sufficient for practical use that $n_P$ has a value which satisfies the following condition (15):

$$n_0' \leq n_P \leq n_{LC}' \quad (15)$$

When $n_P$ satisfies the condition (15) mentioned above, it is sufficient that D·t satisfies, in place of the condition (13), the following condition (16):

$$D \cdot t \leq \lambda \cdot 60 \ \mu m \quad (16)$$

This is because reflectance is proportional to a square of a difference between refractive indices of media on both sides of a reflecting surface according to Fresnel's reflection law, whereby reflection on a borders between the polymers composing the polymer cells 18 and liquid crystal molecules 17, or lowering of transmittance of the polymer dispersive liquid crystal layer 14, is nearly proportional to a square of a difference between refractive indices of the polymers and the liquid crystal molecules 17.

Though the foregoing description has been made of the case where $n_0' \approx 1.45$ and $n_{LC}' \approx 1.585$, it is generally sufficient that D·t satisfies the following condition (17):

$$D \cdot t \leq \lambda \leq 15 \ \mu m \cdot (1.585 - 1.45)^2/(n_u - n_P)^2 \quad (17)$$

wherein $(n_u - n_P)^2$ is $(n_{LC}' - n_P)^2$ or $(n_0' - n_P)^2$ whichever is larger.

Though a larger value of ff is more advantageous for a large variation of a focal length of the vari-focal lens component 11, ff=1 zeroes a volume of the polymers, thereby making it impossible to form the polymer cells 18. Therefore, it is sufficient that ff has a value which satisfies the following condition (18):

$$0.1 \leq ff \leq 0.999 \quad (18)$$

Further, in order to obtain a higher effect of the vari-focal lens elements, i.e., to make a larger variation of a focal length, it is desirable that ff has a larger value, or a value not smaller than 0.5 so as to satisfy the following condition (18-5):

$$0.5 \leq ff \leq 0.999 \quad (18\text{-}5)$$

Since τ is enhanced as ff has a smaller value, on the other hand, it is desirable that D·t satisfies, in place of the condition (17), the following condition (19):

$$4 \times 10^{-6} \ [\mu m]^2 \leq D \cdot t \leq \lambda \cdot 45 \ \mu m \cdot (1.585 - 1.45)^2/(n_u - n_P)^2 \quad (19)$$

Figure 1:
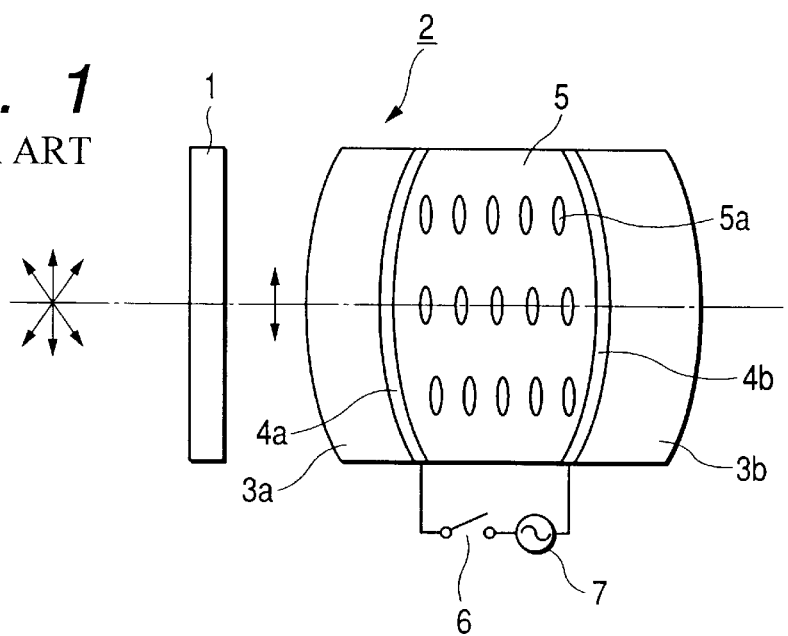
FIG. 1 shows a sectional view illustrating a composition of a conventional optical system which uses a liquid crystal lens component.
Figure 2:
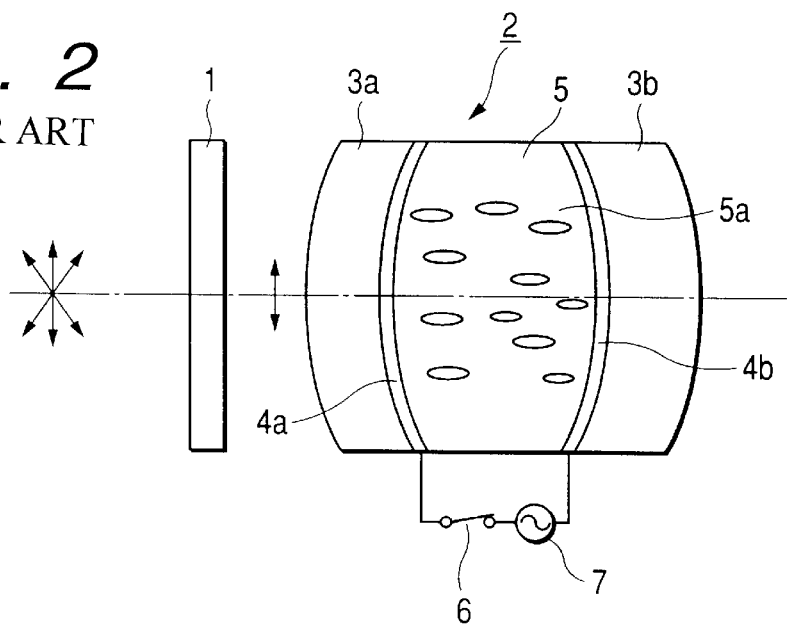
FIG. 2 shows a sectional view illustrating a condition where an electric field is applied to the liquid crystal lens component shown in FIG. 1.
Figure 3:
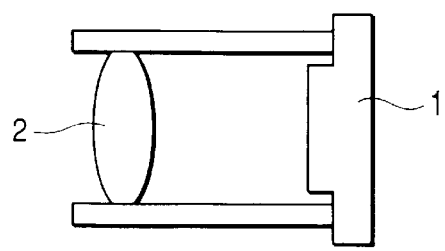
FIG. 3 shows a sectional view illustrating a composition of a conventional electronic image pickup unit.

Further, a lower limit of t lies at D as apparent from FIG. 1 and a lower limit of D·t lies at $(2 \times 10^{-3} \ \mu m)^2$, or $4 \times 10^{-6} \ [\mu m]^2$, since D is not shorter than 2 nm as described above.

The foregoing description is made on an assumption that favorable values are demanded for light scattering by the vari-focal lens element and transmittance thereof. However, optical system, image pickup apparatus, illumination system, signal processing systems, etc. which are to be manufactured at low costs may not require so favorable scattering and transmittance and it is sufficient in such cases to satisfy, in place of the condition (19), the following condition (19-5)

$$4 \times 10^{-6} \ [\mu m]^2 \leq D \cdot t \leq \lambda \cdot 450 \ \mu m \ (1.585 - 1.45)^2/(n_u - n_P)^2 \quad (19\text{-}5)$$

Furthermore, approximations of optical characteristics of substances to expressions of refractive indices are valid only in cases where D is larger than 10 nm to 5 nm as described in "Minor Planets will Come in Iwanami Science Library 8" Tadashi Mukai, 1994, P 58. When D exceeds 500λ, rays are scattered geometrically and scattering of rays on the interfaces between the polymers composing the polymer cells 18 and the liquid crystal molecules 17 is increases according to Fresnel's reflection formula. It is therefore sufficient for practical use that D is within a range defined by the following condition (20):

$$7 \ nm \leq D \leq 500\lambda \quad (20)$$

In the composition shown in FIG. 4 or FIG. 7, $n_{Ox}$, $n_{Oy}$, $n_O$, $n_z$, $n_e$, $n_P$, ff, D, t, λ, $R_1$, $R_2$, $n_{LC}'$, $n_{LC}$, $n_A$, $n_B$, $f_1$, $f_2$ and a diameter φ of the vari-focal lens component 11 have, as an embodiment, values which are listed below:

$n_{Ox} = n_{Oy} = n_O = 1.5$
$n_Z = n_e = 1.75$
$n_P = 1.54$
ff=0.5
D=50 nm
t=125 μm
λ=500 nm
$R_1$=25 mm
$R_2 = \infty$
$n_{LC}' = n_{LC} = 1.5833$
$n_A = 1.5617$
$n_B = 1.52$
$f_1$=44.5 mm
$f_2$=48.04 mm
φ=5 mm In this case, the right side of the above-mentioned formula (19) is:

$$45 \ \mu m \cdot (1.585-1.45)^2 \cdot (n_u - n_P)^2 = 500 \ nm \cdot 45 \ \mu m \cdot (0.135)^2 / (0.0433)^2 \approx 218712 \ nm \cdot \mu m$$

Further, D·t is:

$$D \cdot t = 50 \ nm \cdot 125 \ \mu m = 6250 \ nm$$

Hence, the formula (19) is surely satisfied.

In the embodiment described above, both $R_1$ and $R_2$ may be infinite. In such a case, an optical path length of the polymer dispersive crystal layer 14 is changed by turning on and off a voltage, whereby the vari-focal lens component 11 may be disposed at a location of a lens system where a light bundle is not parallel and used for adjusting a focused condition or changing a focal length of the lens system as a whole.

Figure 8:
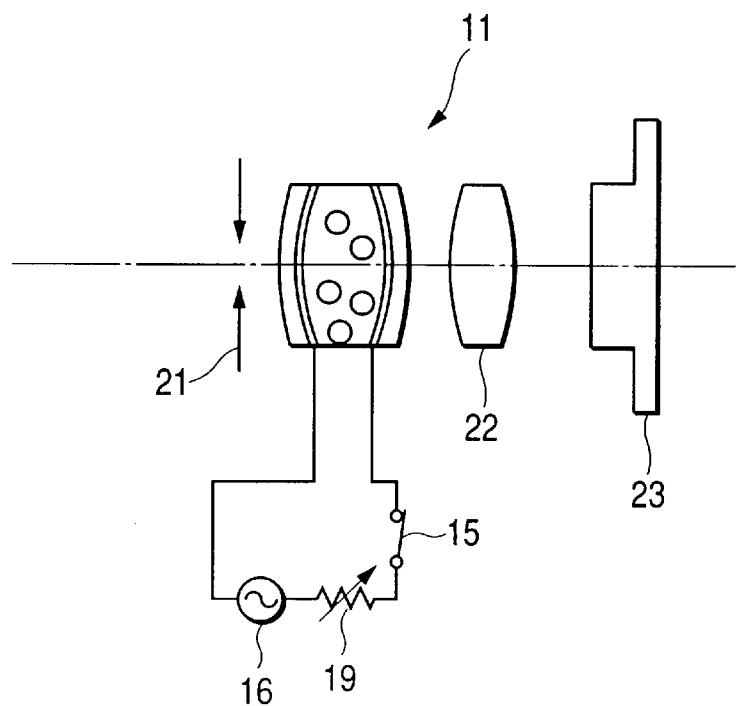
FIG. 8 shows a sectional view exemplifying a digital camera which uses the vari-focal lens component according to the present invention.

FIG. 8 shows a composition of an image pickup optical system for digital cameras which uses the vari-focal lens component 11 shown in FIG. 7. This image pickup optical system forms an image of an object (not shown) on a solid-state image pickup device 23 which is composed, for example, of a CCD by way of a stop 21, the vari-focal lens component 11 and a lens component 22. In FIG. 8, liquid crystal molecules are not shown.

When a focal length of the vari-focal lens component 11 is changed by adjusting an AC voltage applied to a polymer dispersive liquid crystal layer 14 of the vari-focal lens component 11 with a variable resistor 19, it is possible to focus this image pickup optical system continuously on object distances from infinite to 600 mm, for example, without moving the vari-focal lens component 11 and the lens component 22 in a direction along an optical axis.

Figure 9:
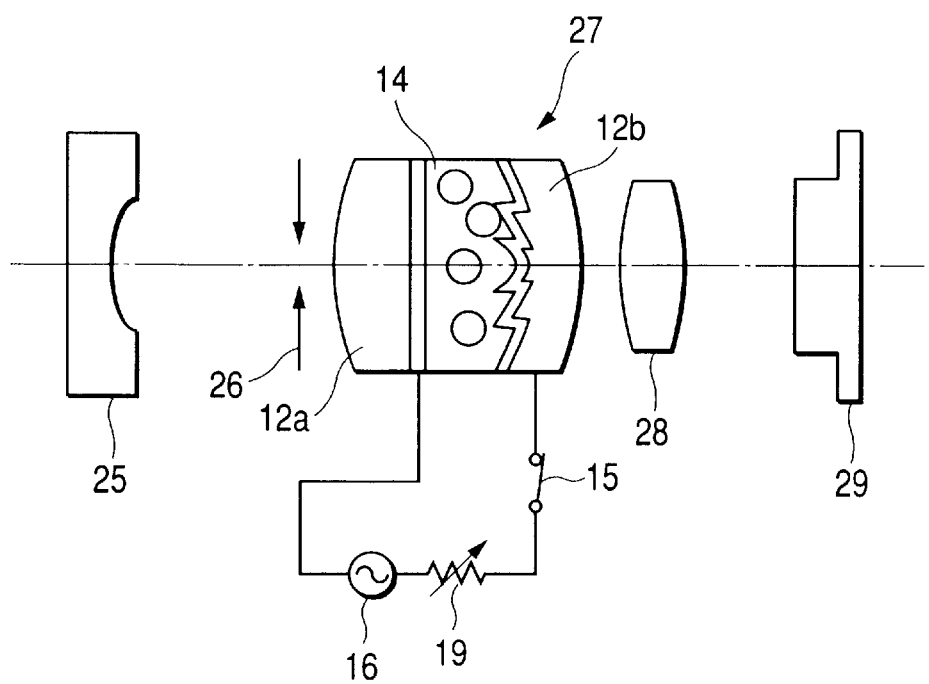
FIG. 9 shows a sectional view exemplifying an objective lens system for electronic endoscopes which uses the vari-focal lens component according to the present invention.

FIG. 9 shows a composition of an objective optical system for electronic endoscopes which uses the vari-focal lens component according to the present invention. This objective optical system forms an image of an object (not shown) on a solid-state image pickup device 29 which is composed, for example, of a CCD by way of a front lens component 25, a stop 26, a vari-focal lens 27 and a rear lens component 28. The vari-focal lens component 27 has a composition which is the same as that shown in FIG. 7, except for an inside surface of a lens element 12a disposed on one side of a polymer dispersive liquid crystal layer 14 which is configured as a planar surface having an infinite radius of curvature $R_1$ and an inside surface of another lens element 12b which is configured as a Fresnel lens surface so that an AC voltage is applied to the polymer dispersive liquid crystal layer 14 from an AC power source 16 by way of a variable resistor 19 and a switch 15. Liquid crystal molecules are not shown in FIG. 9.

By adjusting an AC voltage applied to the polymer dispersive liquid crystal layer 14 dependently on object distances to change a focal length of the vari-focal lens component 27, it is also possible to perform focus adjustments of this objective optical system without moving the vari-focal lens component 27 and the rear lens component 28 along an optical axis.

Figure 10:
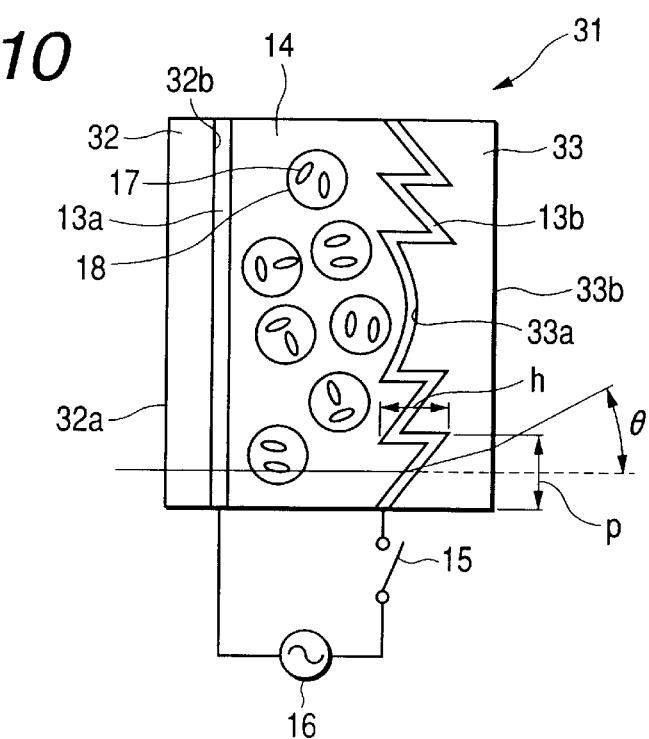
FIG. 10 shows a sectional view illustrating an example of the vari-focal diffractive optical element according to the present invention.

FIG. 10 exemplifies a composition of a vari-focal diffractive optical element according to the present invention (the vari-focal lens component using a diffractive optical element according to the present invention). A vari-focal diffractive optical element 31 comprises a first transparent substrate (first optical member) 32 having first and second surfaces 32a and 32b in parallel with each other, and a second transparent substrate (second optical member) 33 having a third surface 33a forming a ring-like diffraction grating which has a sawtooth-shaped section having a groove depth on the order of a wavelength of a ray and a fourth planar surface 33b: the vari-focal diffractive optical element being configured so as to allow rays to emerge through the first and second transparent substrates 32 and 33. A polymer dispersive liquid crystal layer 14 is disposed between the first and second transparent substrates 32 and 33 by way of the transparent electrodes 13a and 13b as in the composition described with reference to FIG. 1, and the transparent electrodes 13a and 13b are connected to an AC power source 16 by way of a switch 15 so that an AC electric field is applied to the polymer dispersive liquid crystal layer 14.

Applicable to the composition described above is the following formula (21):

$$p \sin \theta = m\lambda \tag{21}$$

wherein the reference symbol p represents a pitch of gratings on the third surface 33a for rays incident on the vari-focal diffractive optical element 31 (the optical member having the diffraction grating) and the reference symbol m designates an integer.

That is, the incident rays emerge at an angle of deflection θ. When the following equations (22) and (23) are satisfied, a diffraction efficiency is 100% at a wavelength λ, thereby allowing to prevent flare from being produced:

$$h(n_A - n_{33}) = m\lambda \tag{22}$$

$$h(n_B - n_{33}) = k\lambda \tag{23}$$

wherein the reference symbol h represents a groove depth, the reference symbol $n_{33}$ designates a refractive index of the transparent substrate 33 and the reference symbol k denotes an integer.

By subtracting both the sides of the equation (23) from both the sides of the equation (22), we obtain the following equation (24):

$$h(n_A - n_B) = (m-k)\lambda \tag{24}$$

Assuming that λ=500 nm, $n_A$=1.55 and $n_B$=1.5, for example, the equation (24) is:

$$0.05h = (m-k) \cdot 500 \text{ nm}$$

When m=1 and k=0, h is calculated as follows:

h=10000 nm=10 μm

As judged from the equation (22) mentioned above, it is sufficient in this case that the transparent substrate 33 has a refractive index $n_{33}$=1.5. When the grating has a pitch P of 10 μm at a marginal portion of the vari-focal diffractive optical element 31, θ≈2.87°, whereby a lens component which has an F number of 10 can be obtained.

Since the vari-focal diffractive optical element 31, thus obtained has an optical path length which is changed by turning on and off a voltage applied to the polymer dispersive liquid crystal layer 14 and, it can be disposed at a location of a lens system where a light bundle is not parallel and used for adjusting a focused condition, changing a focal length of a lens system as a whole or another purpose.

For practical use, it is sufficient that the embodiment satisfies, in place of the equations (22) through (24), the following conditions (25), (26) and (27):

$$0.7m\lambda \leq h(n_A - n_{33}) \leq 1.4m\lambda \tag{25}$$

$$0.7k\lambda \leq h(n_B - n_{33}) \leq 1.4k\lambda \tag{26}$$

$$0.7(m-k)\lambda \leq h(n_A - n_B) \leq 1.4(m-k)\lambda \tag{27}$$

Figure 11:
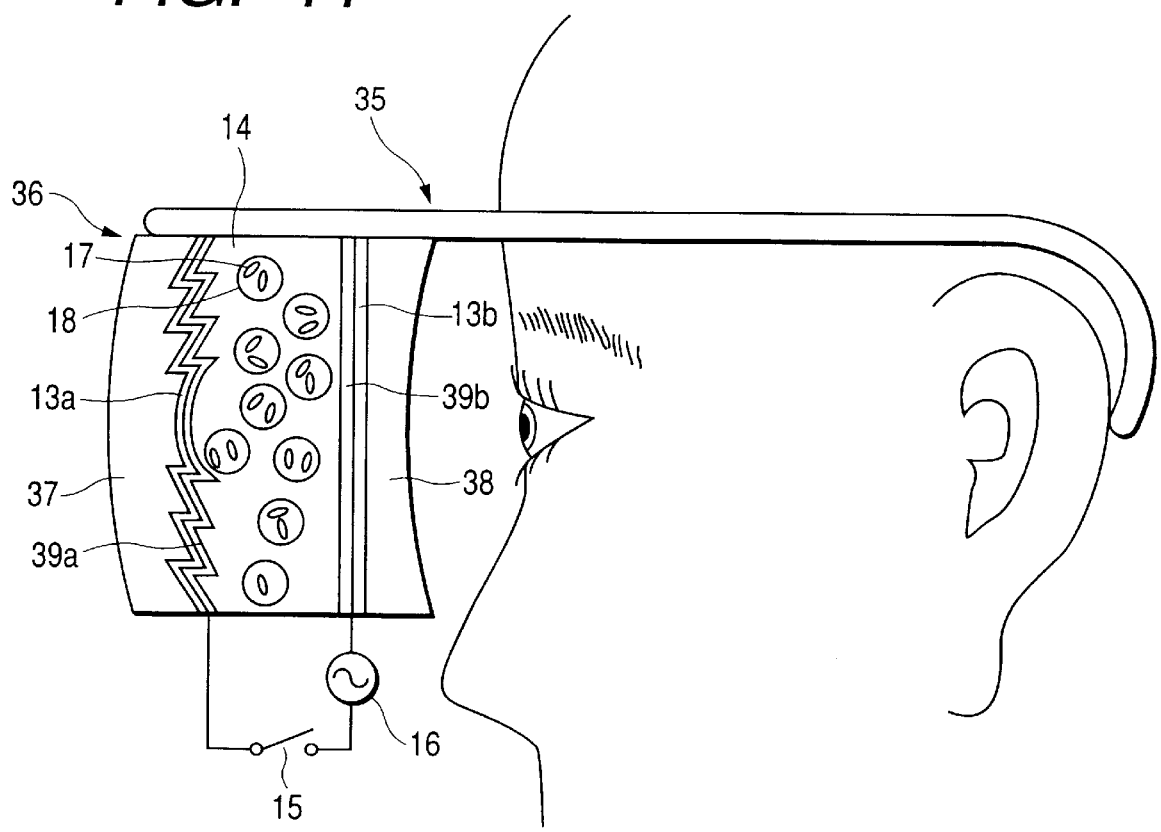
FIG. 11 shows a sectional view illustrating vari-focal spectacles which uses the vari-focal diffractive optical element according to the present invention.
Figure 12:
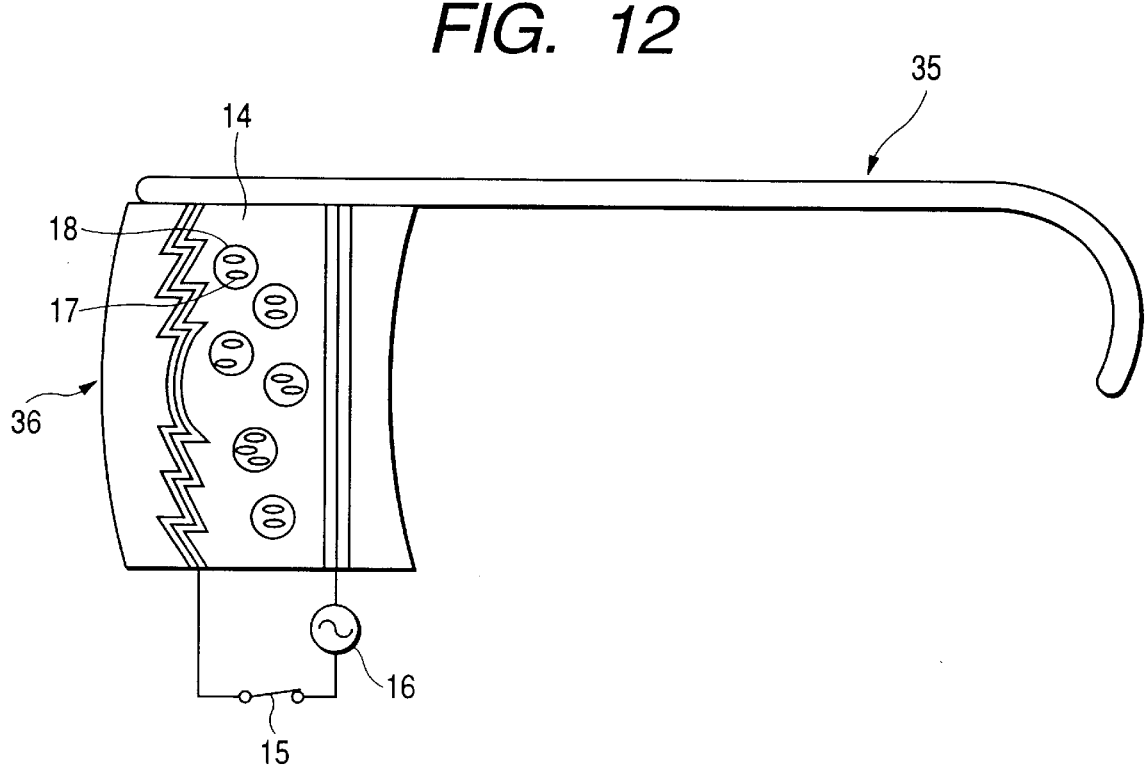
FIG. 12 shows a sectional view illustrating a condition wherein an electric field is applied to the diffractive optical element of the vari-focal spectacles shown in FIG. 11.

FIGS. 11 and 12 show vari-focal spectacles (spectacles using vari-focal lens components) 35 which use a vari-focal diffractive optical element 36 as a spectacle lens component. The vari-focal diffractive optical element 36 has lens elements 37 and 38, and a ring-like diffraction grating which has a saw-tooth shaped section similar to that described with reference to FIG. 10 is formed on an inside surface of the lens element 37 disposed on the side of incidence. Orientation films 39a and 39b are disposed on the inside surfaces of the lens elements 37 and 38 by way of transparent electrodes 13a and 13b respectively, and a polymer dispersive liquid crystal layer 14 similar to that described with reference to FIG. 4 is disposed between the orientation films 39a and 39b. Further, the transparent electrodes 13a and 13b are connected to an AC power source 16 by way of a switch 15 so that an AC electric field is applied to the polymer dispersive liquid crystal layer 14.

Figure 13:
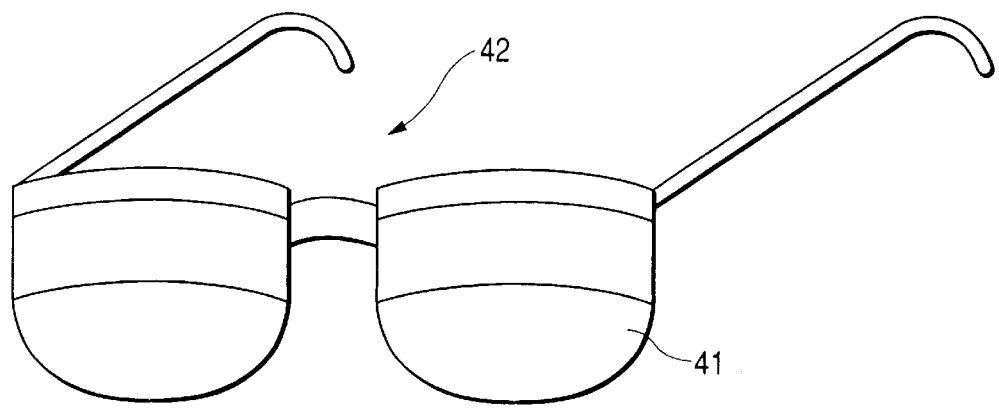
FIG. 13 shows a perspective view illustrating spectacles which uses a conventional lens components having dual focal points.

Since orientation of liquid crystal molecules 17 in the polymer dispersive liquid crystal layer 14 is changed between a condition where the switch 15 is turned off as shown in FIG. 11 and another condition where the switch 15 is turned on as shown in FIG. 12, the vari-focal spectacle 35 which has the configuration described above is capable of changing a diopter of the spectacle as a whole. Accordingly, the vari-focal spectacle 35 according to the present invention shown in FIGS. 11 and 12 does not change a diopter dependently on directions of an eye, thereby eliminating a feeling of incompatibility unlike conventional spectacles 42 which use lens components 41 having dual focal points shown in FIG. 13.

Figure 14:
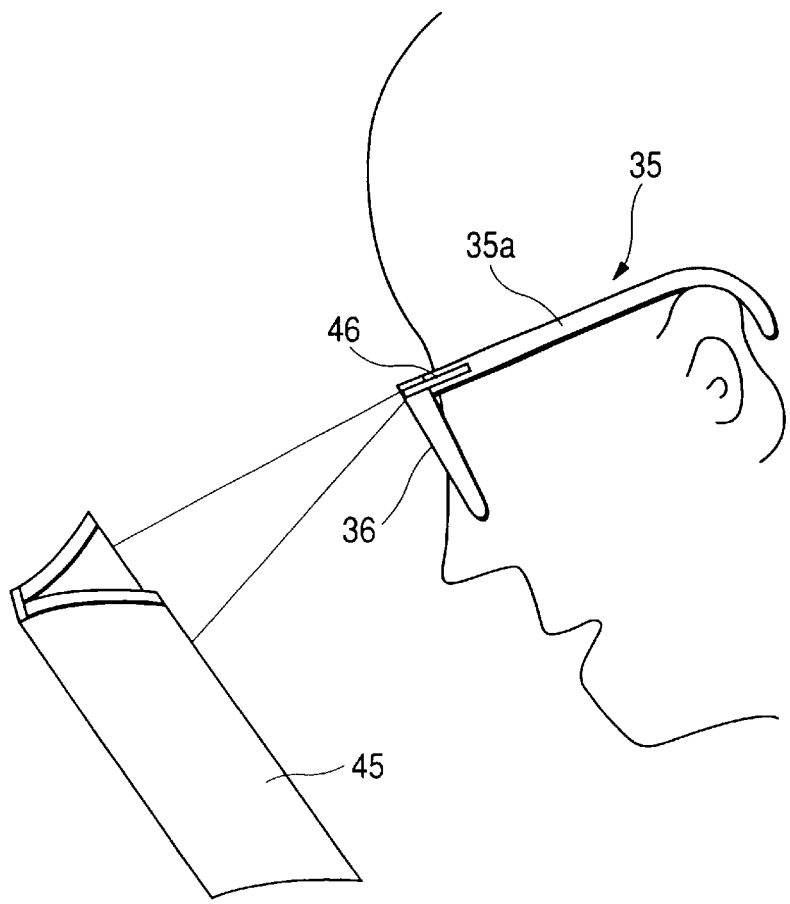
FIG. 14 shows a diagram illustrating a modification example of the vari-focal spectacles.

Vari-focal spectacles shown in FIG. 14 is a vari-focal spectacles 35 shown in FIG. 11 which is equipped with a range finder sensor 46 for measuring a distance to the object 45 disposed, for example, on a frame 35a and configured to automatically adjust diopter of the spectacles by performing on/off control of the switch 15 on the basis of an output from the range finding sensor 46.

By configuring spectacles so as to automatically adjust a diopter on the basis of object distances as described above, it is possible to obtain spectacles which are convenient for the aged who have weakened diopter adjusting abilities.

Figure 15:
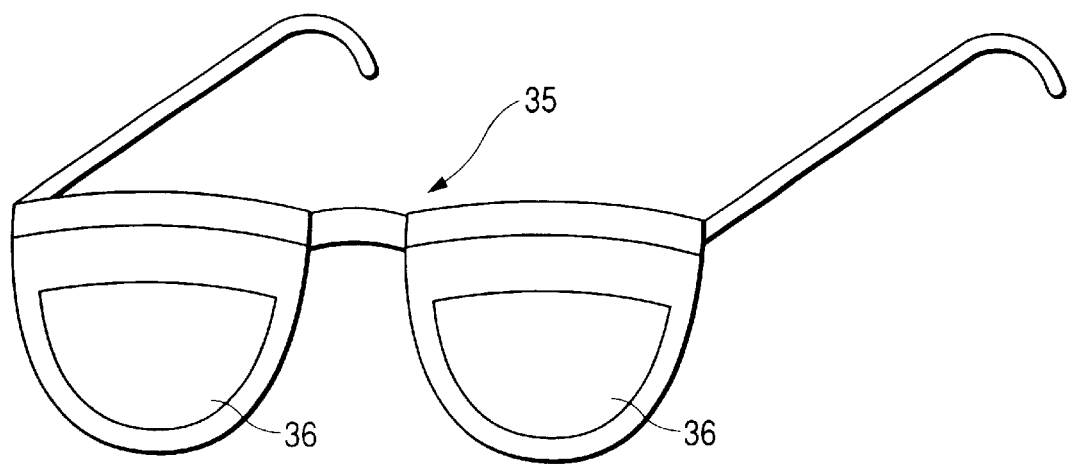
FIG. 15 shows a perspective view illustrating another modification example of the vari-focal spectacles.

Though the spectacle lens component is composed entirely of the vari-focal diffractive optical element 36 in the vari-focal spectacles 35 shown in FIGS. 11 and 14, it is possible to dispose the vari-focal diffractive optical element 36 as a portion of a spectacle lens component, for example, at a location which is a little lower than a center as shown in FIG. 15. Further, the vari-focal lens component 11 shown in FIG. 4 or the vari-focal lens component 27 shown in FIG. 9 may be used in place of the vari-focal diffractive optical element 36. Though the vari-focal spectacles shown in FIG. 14 is configured to turn over the switch 15 on the basis of the output from the range finder sensor 46, it is possible to dispose an additional switch so as to permit selection between the automatic switching with the range finder sensor 46 and a manual switching or modification to the manual switching during the automatic switching with the range finder sensor 46. Furthermore, it is possible to integrate a hearing aid with the vari-focal spectacles 35 described above.

When the range finder sensor 46 is to be disposed on the vari-focal spectacles as shown in FIG. 14, it is possible to vary stepwise or continuously a voltage to be applied to the polymer dispersive liquid crystal layer 14 of the vari-focal diffractive optical element 36, and preset correspondence between an output from the range finder sensor 46 and an applied voltage dependently on a user so as to control the applied voltage on the basis of the output from the range finder sensor 46. By controlling the applied voltage as described above, it is possible to adjust a diopter more accurately and automatically for each user dependently on object distances.

The AC power source 16 for the vari-focal spectacles 35 described above can be composed of an inverter circuit which uses batteries as its power source. In this case, the vari-focal spectacles 35 can be equipped with one kind or plural kinds of batteries such as manganese batteries, lithium batteries, solar batteries and rechargeable batteries, which may be integrated with the frame 35a or built therein, separately disposed and connected by way of cords or consists of a built-in battery and an external battery.

Figure 16:
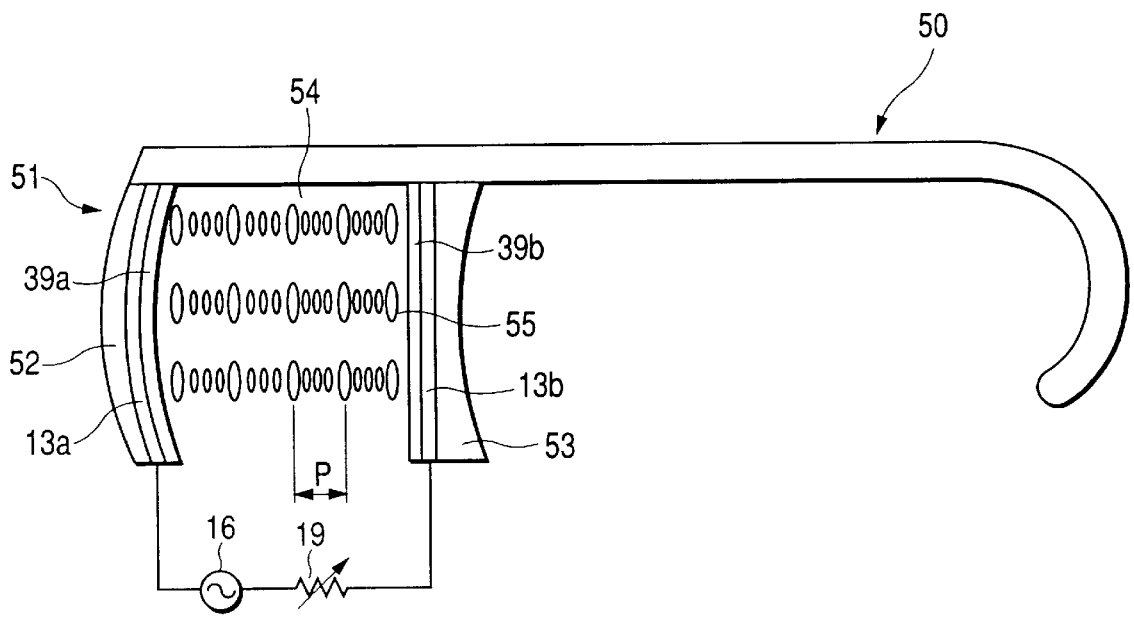
FIG. 16 shows a sectional view illustrating vari-focal spectacles having vari-focal lens components which use a twist nematic liquid crystal.
Figure 17:
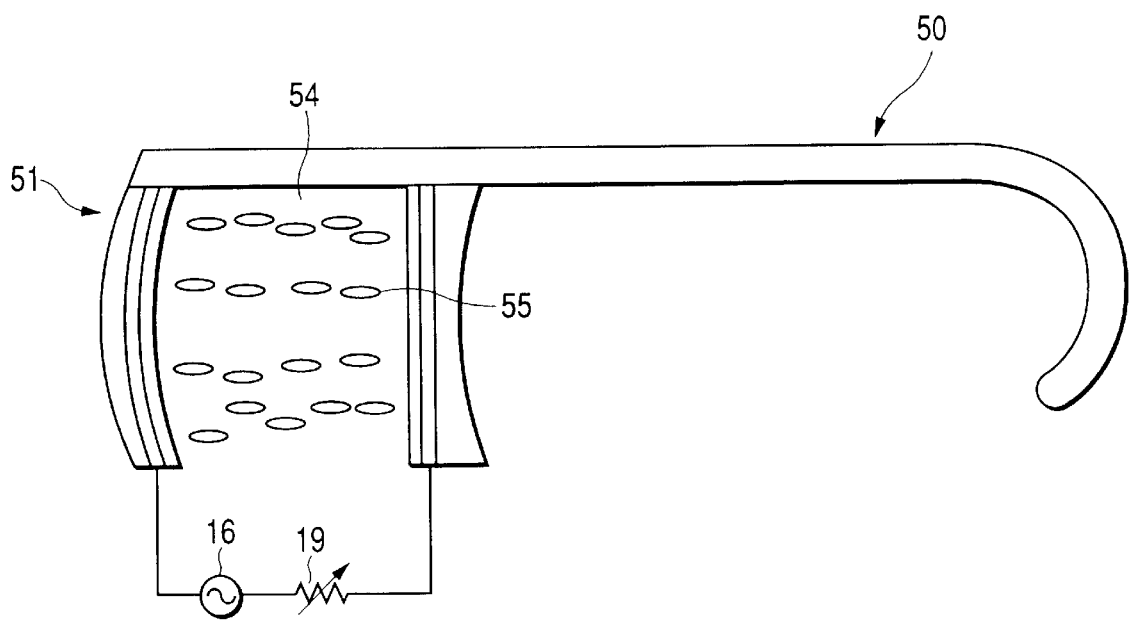
FIG. 17 shows a sectional view illustrating an orientation of liquid crystal molecules in a condition where a voltage applied to a twist nematic liquid crystal layer is enhanced in the spectacles shown in FIG. 16.

For simply composing vari-focal spectacles, it is possible to adopt vari-focal lens components which use a twisted nematic liquid crystal or a liquid crystal having a twisted orientation such as a choresteric liquid crystal, in place of the vari-focal lens components which use the polymer dispersive liquid crystal described above. FIGS. 16 and 17 show a configuration of vari-focal spectacles 50 using a twisted nematic liquid crystal, wherein a vari-focal lens component 51 is composed of lens elements 52 and 53, orientation films 39a and 39b which are disposed on inside surfaces of these lens elements by way of transparent electrodes 13a and 13b, and a twisted nematic liquid crystal layer 54 which is disposed between the orientation films: the transparent electrodes 13a and 13b being connected to an AC power source 16 by way of a variable resistor 19 so that an AC electric field is applied to the twisted nematic liquid crystal layer 54.

When a voltage applied to the twisted nematic liquid crystal layer 54 is enhanced in the vari-focal spectacles which has the configuration described above, liquid crystal molecules 55 are homeotropically oriented as shown in FIG. 17, whereby the twisted nematic liquid crystal layer 54 has a lower refractive index and a longer focal length as compared with the twisted nematic condition shown in FIG. 16 where a lower voltage is applied.

Since a spiral pitch P of the liquid crystal molecules 55 must be sufficiently short as compared with a wavelength $\lambda$ of rays in the twisted nematic condition shown in FIG. 16, it is desirable to satisfy, for example, the following condition (28):

$$2 \text{ nm} \leq P \leq 2\lambda/3 \tag{28}$$

The lower limit (2 nm) of the condition (28) is determined by a size of liquid crystal molecules and the upper limit ($2\lambda/3$) is required to allow the twisted nematic liquid crystal layer 54 to behave as an isotropic medium in the condition shown in FIG. 16 when natural light is incident. If the pitch P has a value exceeding the upper limit, the vari-focal lens component 51 has a focal length which is different dependently on directions of polarization, thereby forming a dualized or blurred image.

However, high optical performance may not be demanded for practical use in certain cases, and it is sufficient in such case to satisfy, in place of the condition (28), the following condition (28-5):

$$2 \text{ nm} \leq P \leq 40\lambda \tag{28-5}$$

A form and a design of a frame 35a of spectacles are usually selected as desired by a user.

Figure 18:
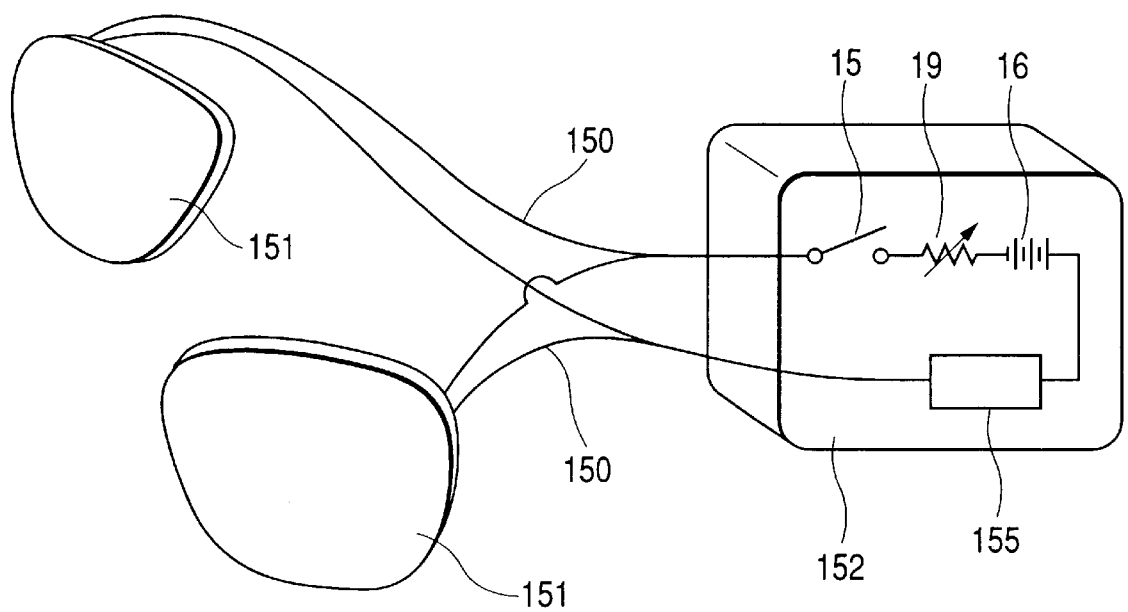
FIG. 18 shows a perspective view illustrating connection between vari-focal spectacle lens components of the vari-focal spectacles according to the present invention and a driving unit.

For allowing a user to optionally select a frame, it is convenient to configure a component which consists of a power source 16, a switch 15, cords 150, etc. for vari-focal lens components to be used with spectacles 35 shown in FIG. 18, for example, as a separate component and fix it to the spectacles 35 after electrically connecting these parts to the vari-focal spectacles.

An example of the spectacles described above is shown in FIG. 18, wherein a reference numeral 151 represents spectacle lens components which use a liquid crystal, a reference numeral 152 designates a driving unit: the spectacle lens components being electrically connected to the driving unit by way of cords 150. The vari-focal spectacle lens components 151 which use the liquid crystal and the driving unit 152 may be manufactured separately and coupled with one another.

Figure 19:
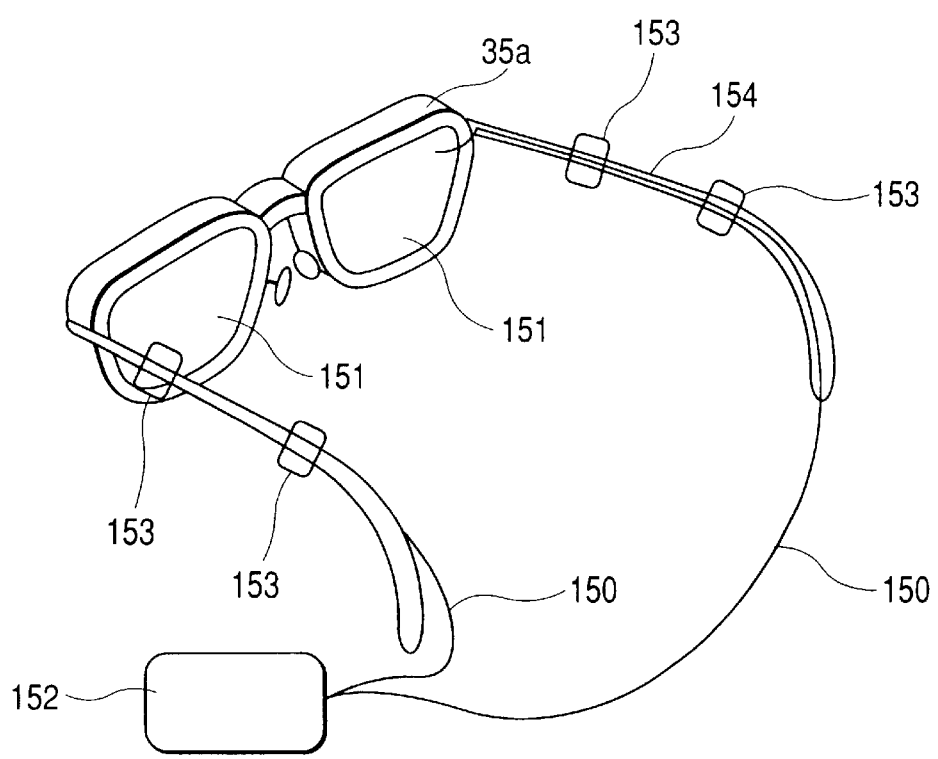
Figure 20:
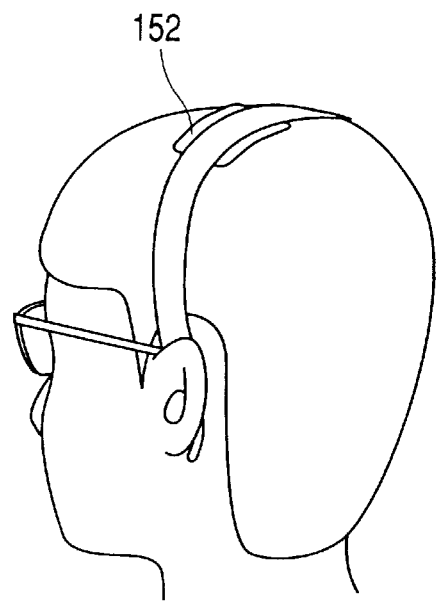
FIG. 20 shows a perspective view illustrating a condition where a person puts on the vari-focal spectacles according to the present invention.
Figure 21:
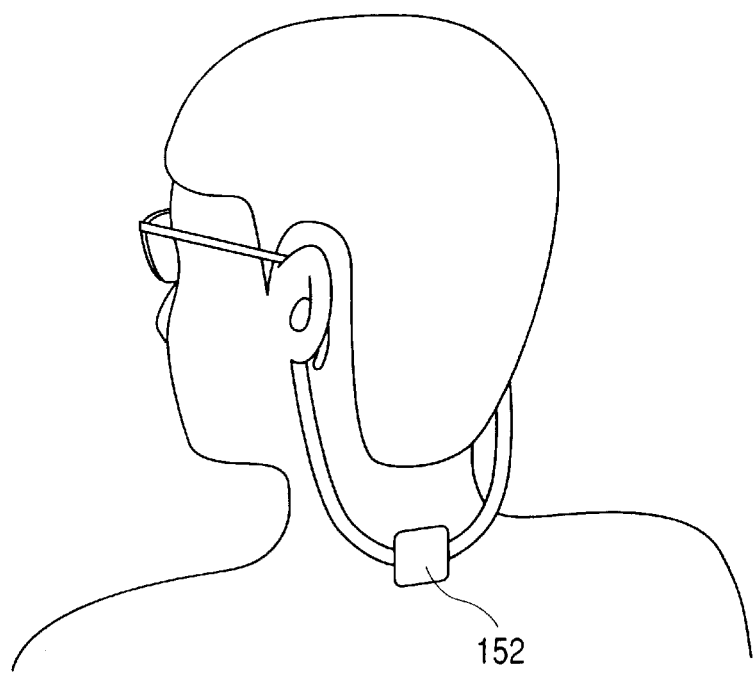
FIG. 21 shows a perspective view illustrating a condition where a person puts on another vari-focal spectacles according to the present invention.

FIG. 19 shows a condition where the vari-focal spectacle lens components 151 using the liquid crystal and the driving unit 152 are attached to a spectacle frame 154, and the cords 150 are fixed with fixing means 153 such as bands or heat-shrinkable rings or adhesive tape. The frame 154 may be used as a user likes. The driving unit 152 may be put in a pocket or the like. Alternately, the driving unit 152 can be put on a head like a headphone as shown in FIG. 20 or hung behind ears, under the occipital region or on the neck as shown in FIG. 21. In this case, the cords may be disposed in or on sidepieces of the frame 154 so that the cords 150 can be adopted by replacing only the sidepieces of the frame 154. For example, it is conceivable to pass the cords through slots formed in the sidepieces of the frame 154 or form cords by printed wiring as shown in FIG. 19. A reference numeral 155 represents an AC current generating circuit, for example, an oscillator circuit or an inverter circuit.

Figure 22:
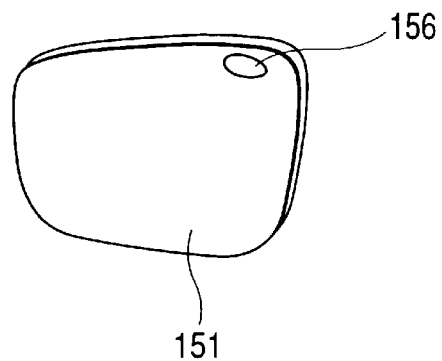
FIG. 22 is a perspective view showing an example wherein a driving unit is disposed in a vari-focal lens component.

FIG. 22 shows an example wherein a switch 156 is disposed at a location of an outside surface of a lens component, thereby making it possible to change a focal length simply by touching the outside surface of the lens component, or without touching a driving unit 152 unlike the example wherein the switch is disposed on the driving unit 152. When the switch 156 is configured as a touch-switch, it can be conveniently manipulated with a weak force or a light touch.

Figure 23:
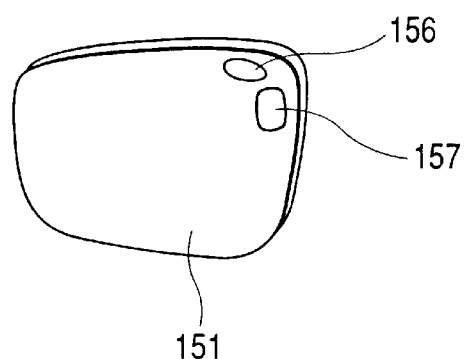
FIG. 23 is a perspective view showing an example wherein a driving electronic circuit is disposed in a vari-focal lens component.

FIG. 23 shows an example wherein a circuit for driving a vari-focal lens component other than a power supply is formed at an outer circumferential portion by using a transistor manufacturing technique or the like. This circuit permits composing a driving unit 157 so as to have a simple configuration and a light weight, thereby providing a user's convenience.

Figure 24:
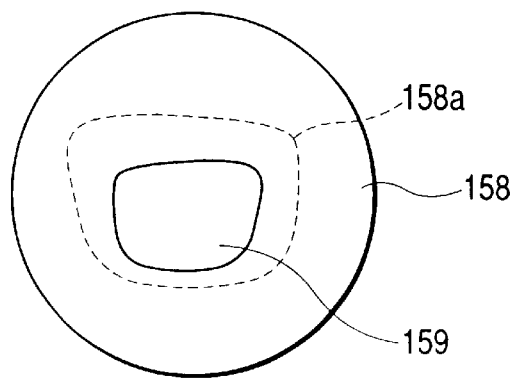
FIG. 24 is a diagram showing an example to form a vari-focal lens component so as to match with a spectacle frame.

FIG. 24 shows an example of lens component which can be combined with various frames, wherein rather a large vari-focal lens component 158 is formed so as to permit cutting out a portion 158a thereof which is matched with a frame. In this example, a vari-focal lens portion is formed as a section indicated by a reference numeral 159 which is formed inside the member 158.

When a vari-focal lens component is formed in a shape described above, it can be shaped so as to match with various frames.

For security against power failure during driving of automobiles, for example, all of the vari-focal spectacles described above are to be configured so that they are focused on long object distances in cases where the power sources are turned off due to complete discharge of batteries or wire breakage or cases where the driving unit 152 becomes defective. Such a configuration is effective to lower a power consumption when a user mainly gazes into the distance for a long time.

Figure 25:
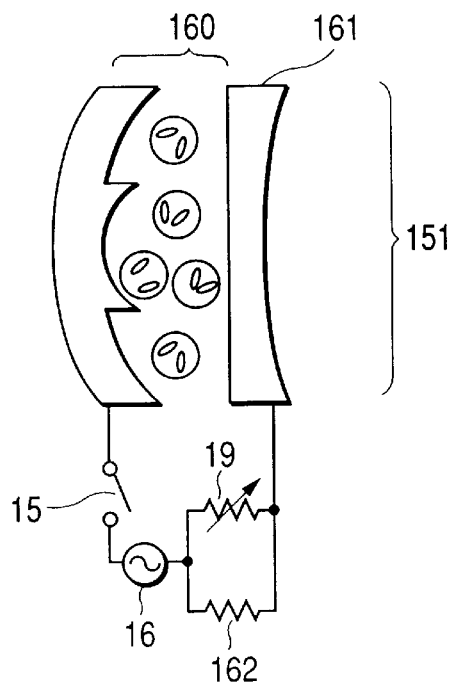
FIG. 25 is a sectional view showing another example of driving circuit for a vari-focal lens component.

For this purpose, a polymer dispersive liquid crystal layer is configured so as to have a function of a concave lens as shown in FIG. 25 so that it exhibits a function of a concave lens which is stronger in a power-off condition than that in a power-on condition, whereby the spectacles are focused on long object distances.

When a user mainly gazes at objects, etc. located at short distances, in contrast, it is advantageous for preventing power sources such as batteries from being consumed to configure the vari-focal spectacles to be focused on short distances in conditions where the power sources are turned off or voltages are low.

On the other hand, certain users of spectacles mostly gaze at images at high contrast of objects which are located at long distances and look at objects located at short distances only for a short time. It is desirable for these users to turn on the power sources so that the spectacles are focused on objects located at long distances at high voltages. When voltages are high as described above, liquid crystal molecules fluctuate little, thereby making it possible to obtain images of high contrast.

For users of spectacles who gaze at images at high contrast of object located at short distances for a long time, in contrast, it is desirable to configure spectacles so that they are focused on short object distances when power sources are turned on or voltages are set at high levels.

That is to say, it is desirable that the power sources are turned on or the voltages are set at the high levels when the users of the spectacles want to see images with high contrast.

Since various persons such as short-sighted persons, far-sighted persons and astigmatic persons use spectacles, it is necessary to configure spectacles so as to be matched with each of the persons. Therefore, it is advantageous to compose one of the two substrates required for composing vari-focal spectacle lens as a common part and configure the other substrate selectively as a convex lens, a concave lens or a cylindrical lens for an astigmatic eye dependently on a user so that one of the substrates can be used commonly, thereby lowering a manufacturing cost.

Since a liquid crystal has an Abbe's number which is smaller than that of a glass material, a liquid crystal lens produces remarkable chromatic aberration. For correcting this chromatic aberration, it is preferable to combine a liquid crystal lens which has a function of a convex lens with a substrate (optical member) which has a function of a concave lens or combine a liquid crystal lens which has a function of a concave lens with a substrate (optical member) which has a function of a convex lens.

FIG. 25 shows an example of such a combination type vari-focal spectacle lens component which consists of a Fresnel lens element 160 of a polymer dispersive liquid crystal which has a function of a convex lens element and a substrate 161 which has a function of a concave lens.

In case of a vari-focal spectacle lens component which uses a diffractive optical element, it produces chromatic aberration in a direction reverse to that of chromatic aberration produced by the spectacle lens component described above. It is therefore preferable to combine a diffractive optical element which has a function of a convex lens with a substrate which has a function of a convex lens or combine a diffractive optical element which has a function of a concave lens with a substrate which has a function of a concave lens.

The vari-focal spectacle lens component shown in FIG. 25 is configured to apply a bias voltage with a resistor 162 when the switch 15 is turned on so as to enhance a response to a change of a focal length by varying a voltage with a variable resistor 19.

For preventing breakage of the liquid crystal in this liquid crystal lens component, it is preferable to select a material which does not contain sodium for the substrate.

Figure 26:
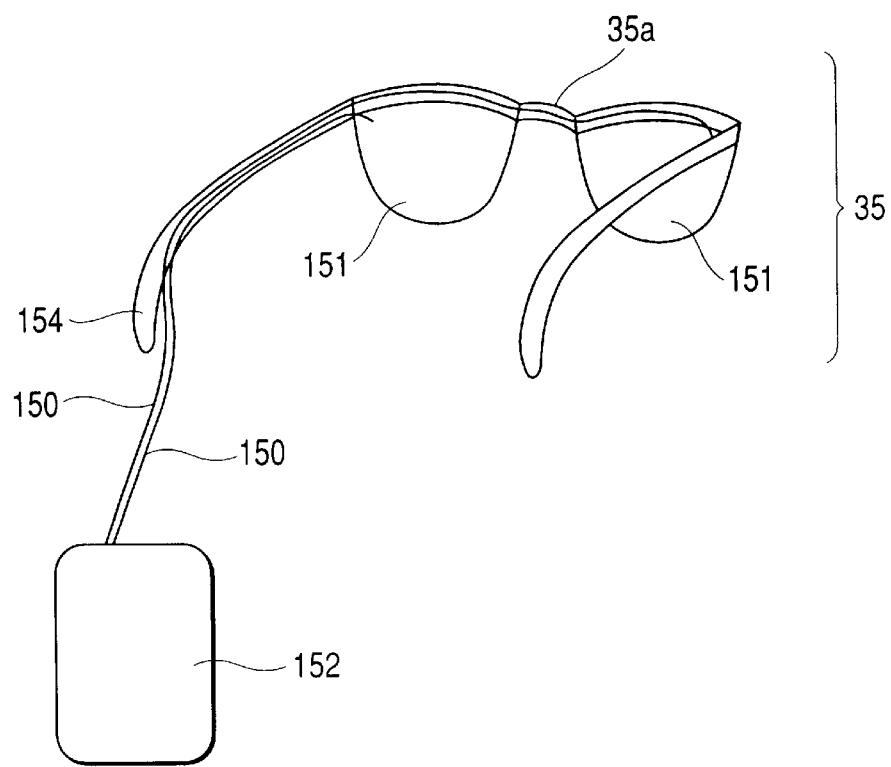
FIG. 26 is a perspective view showing another example of connection between vari-focal lens components of vari-focal spectacles and a driving unit.

The vari-focal spectacle lens components described above require two cords for connection to a driving unit. It is desirable to connect these two cords to the driving unit 152 collectively from one of the spectacle lens components as shown in FIG. 26. When the cords are arranged as shown in FIG. 26, the spectacles 35 can be used conveniently since substantially a single cord is connected to the spectacles 35 and cannot hitch while the spectacles 35 is being put on and off. Cords 150 which are collected as described above may be led out of a sidepiece 154 as shown in FIG. 26 or the vicinity of one of the lens components.

It is important for practical use to arrange the cords coming out of the spectacles 35 not in two systems but in a single system. It is preferable to allow the single system of cords to come out on a side opposite to the skilful hand of a user so that the cords will not constitute a hindrance to the user.

Figure 27A:
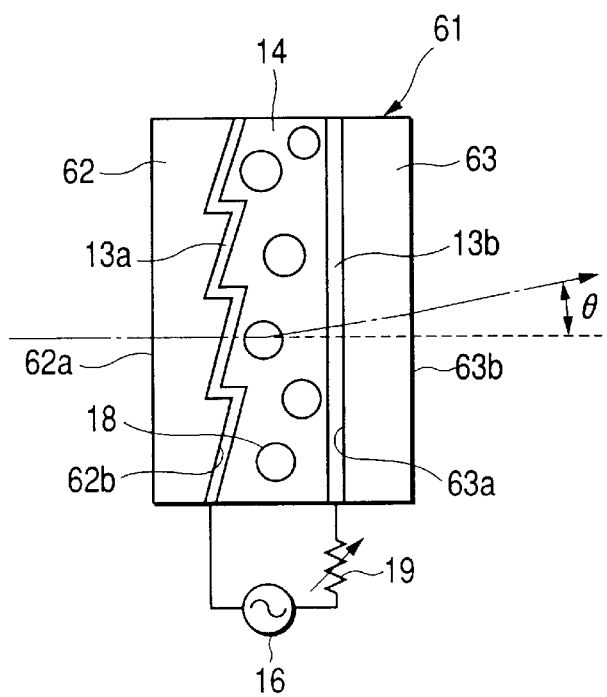
FIGS. 27A and 27B are sectional views exemplifying the variable declination prism according to the present invention.
Figure 27B:
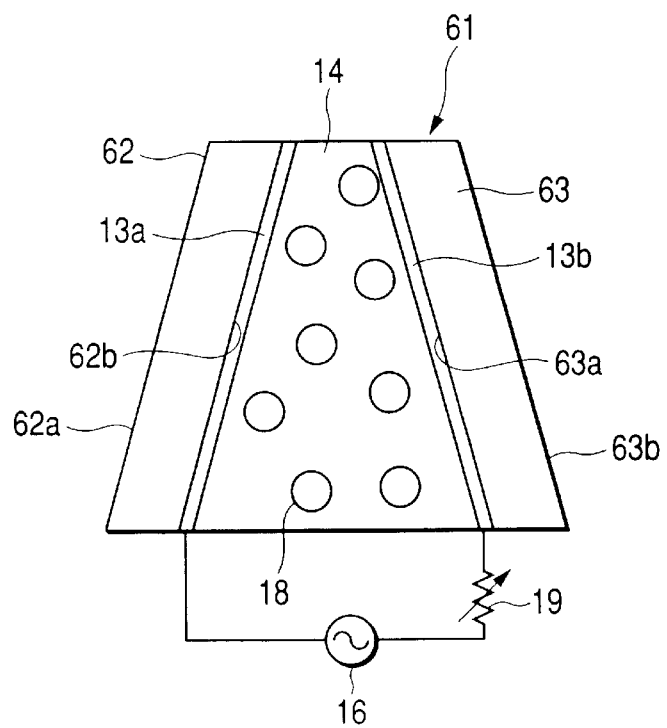

FIG. 27A shows a composition of the variable declination prism according to the present invention. This variable declination prism 61 has a first incidence side transparent substrate (first optical member) 62 which has first and second surfaces 62a and 63b, and a second emergence side transparent substrate (second optical member) 63 which has third and fourth surfaces 63a and 63b, and a shape of a plane parallel plate. An inside surface (the second surface) 62b of the incidence side transparent substrate 62 is configured in a Fresnel shape, and a polymer dispersive liquid crystal layer 14 is disposed between the transparent substrate 62 and the emergence side transparent substrate 63 by way of transparent electrodes 13a and 13b similarly to the polymer dispersive liquid crystal layer which has been described with reference to FIG. 4. The transparent electrodes 13a and 13b are connected to an AC power source 16 by way of a variable resistor 19 so that declinations of rays transmitting through the variable declination prism 61 are controlled by applying an AC electric field to the polymer dispersive liquid crystal layer 14. Though the inside surface 62b of the transparent substrate 62 is configured in the Fresnel shape in FIG. 27A, it is possible, for example, to configure the variable declination prism so as to have an ordinary form of a prism wherein inside surfaces of the transparent substrates 62 and 63 are inclined toward each other as shown in FIG. 27B or a comprise a surface of a diffraction grating as shown in FIG. 10. When a surface is configured as a diffraction grating, the equations (21) through (27) are applicable.

Figure 28:
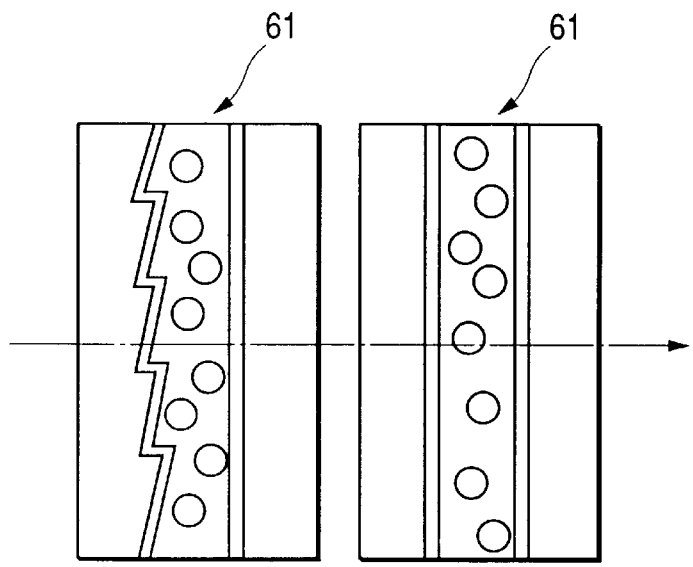
FIG. 28 is a sectional view showing a condition where the variable declination prism shown in FIGS. 27A and 27B is used.

The variable declination prism 61 which has the configuration described above is usable for effectively preventing vibrations, for example, of TV cameras, digital cameras, film cameras and binoculars. It is desirable to configure the variable declination prism 61 so as to refract (deflect) rays in a vertical direction and it is more desirable for obtaining improved performance to dispose two variable declination prisms 61 so as to vary angles of refraction in two different directions, for example, in the vertical direction and a horizontal direction which are perpendicular to each other as shown in FIG. 28. Liquid crystal molecules are not shown in FIGS. 27 and 28.

Figure 29:
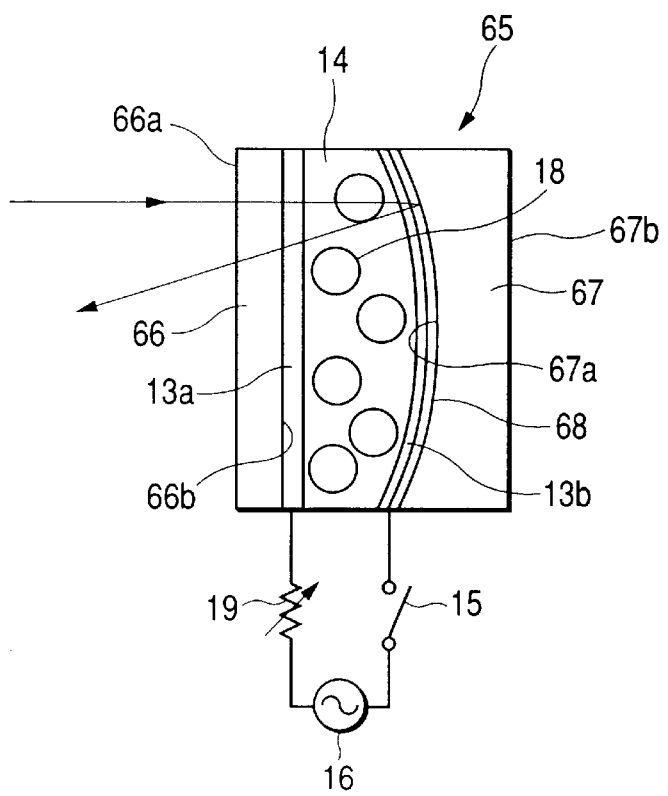
FIG. 29 is a sectional view illustrating the vari-focal mirror according to the present invention.

FIG. 29 shows a vari-focal mirror which is configured as the vari-focal lens component according to the present invention. This vari-focal mirror 65 comprises a first transparent substrate 66 which has first and second surfaces 66a and 66b, and a second transparent substrate 67 which has third and fourth surfaces 67a and 67b. The first transparent substrate 66 is configured so as to have a form of a planar plate or a lens and a transparent electrode 13a which is disposed on its inside surface (the second surface) 66b. The second transparent substrate 67 has an inside surface (the third surface) 67a, which is configured as a concave surface, a reflective film 68 which is formed on this concave surface and a transparent electrode 13b which is disposed on the reflective film 68. A polymer dispersive liquid crystal layer 14 is disposed between the transparent electrodes 13a and 13b similarly to the polymer dispersive liquid crystal layer 14 which has been described with reference to FIG. 4. These transparent electrodes 13a and 13b are connected to an AC power source 16 by way of a switch 15 and a variable resistor 19 so that an AC electric field is applied to the polymer dispersive liquid crystal layer 14. Liquid crystal molecules are not shown in FIG. 29.

Since the configuration described above forms an optical path which allows the reflective film 68 to reflect rays incident on the transparent substrate 66 so as to return the rays through the polymer dispersive liquid crystal layer 14, the vari-focal mirror 65 allows the polymer dispersive liquid crystal layer 14 to function twice and permits changing a focused point of the reflected rays by changing a voltage applied to the polymer dispersive liquid crystal layer 14. Since rays which are incident on the vari-focal mirror 65 transmit through the polymer dispersive liquid crystal layer 14 twice, the equations mentioned above are similarly applicable when twice a thickness of the polymer dispersive liquid crystal layer 14 is taken as t. The thickness of the polymer dispersive liquid crystal layer 14 can be reduced by configuring the inside surface of the transparent substrate 66 or 67 so as to have a form of a diffraction grating as shown in FIG. 10. Such a configuration will provide a merit to reduce scattered rays. In addition, it is possible configure the reflective film 68 so as to have a function of electrode without using the transparent electrode 13b.

Though the AC power source 16 is used for applying an AC electric field to the liquid crystal for preventing deterioration of the liquid crystal in the embodiments described above, it is possible to apply a DC electric field with a DC power source. Further, directions of liquid crystal molecules can be changed by varying not only a voltage but also a frequency of an electric field applied to a liquid crystal, an intensity or a frequency of a magnetic field applied to a liquid crystal or a temperature of a liquid crystal.

Polymer dispersive liquid crystals are available not only in liquid states but also in nearly solid states.

When a polymer dispersive liquid crystal which is in a nearly solid state is to be used as the polymer dispersive liquid crystal layer in the embodiments described above, it is possible to omit at least one of the first and second optical members, for example, either one of the lens elements 12a and 12b shown in FIG. 4, the transparent substrate 32 shown in FIG. 10, the lens element 38 shown in FIG. 11, at least one of the lens elements 52 and 53 shown in FIG. 16, either one of the transparent substrates 62 and 63 shown in FIGS. 17A and 17B or at least one of the transparent substrates 66 and 67 shown in FIG. 29.

Now, description will be made of a manufacturing method of a heterogeneous medium lens element which is used as one of the lens elements.

Figure 30:
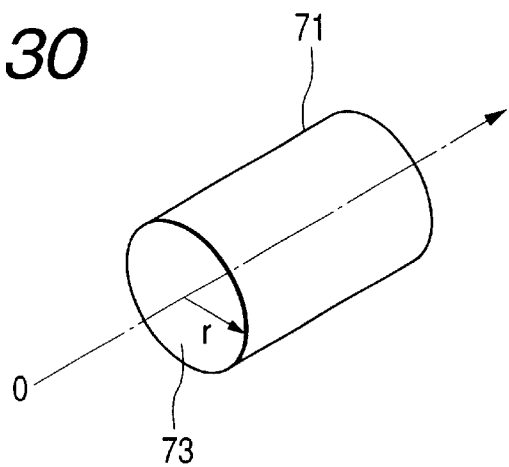
FIG. 30 is a perspective view illustrating a radial gradient heterogeneous medium lens element.
Figure 31:
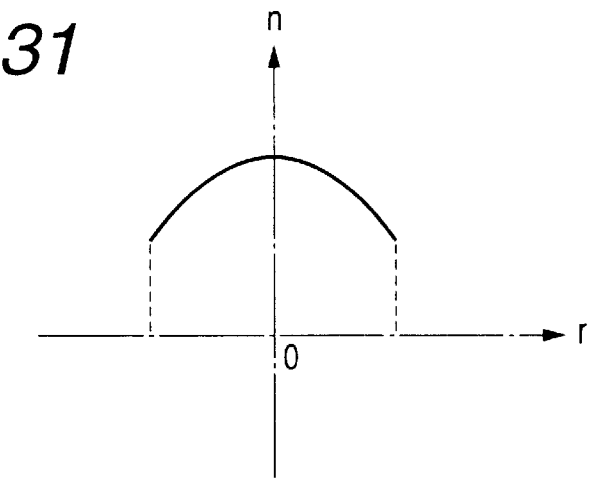
FIG. 31 is a diagram illustrating a refractive index distribution of the radial gradient heterogeneous medium lens element.

A heterogeneous medium lens element is a lens element having a refractive index of medium which is different from portion to portion thereof. A heterogeneous medium lens element 71 which is configured as a radial type gradient index lens element having a refractive index varying in a radial direction as shown in FIG. 30, for example, has a refractive index n which is lowered as a radius r is longer from an optical axis 0 located at an axis (a center axis of a refractive index distribution) as shown in FIG. 31. The refractive index remains unchanged in a direction along the optical axis.

Figure 32:
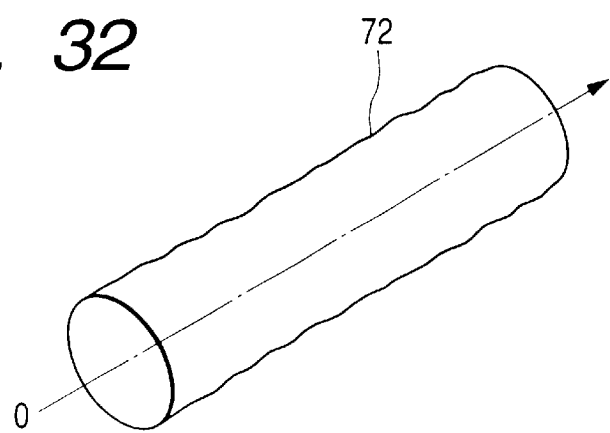
FIG. 32 is a perspective view illustrating a material of a heterogeneous medium lens element.

A material of a heterogeneous medium lens element such as the lens element 71 is manufactured from a material such as a glass or plastic material by the ion exchange method, sol-gel method or the like. However, a material 72 of a heterogeneous medium lens element manufactured by this method has a rod-like form as shown in FIG. 32, and it is necessary to subject the material to cutting, polishing, coating and other steps for obtaining a heterogeneous medium lens element 71 as a final product.

On the other hand, an ordinary homogeneous lens element made of a glass material or the like is manufactured by polishing both surfaces of a lens element and then cutting its outer circumference so as to be revolutionarily symmetrical with regard to a line passing through centers of two spherical surfaces (an optical axis). This method is used generally and widely since it has a merit to permit manufacturing a lens element at a low cost.

Unlike the working of the ordinary lens element, however, manufacturing of the heterogeneous medium lens element requires that the axis of the material 72 is located at a center of an outer circumference and that a lens surface 73 is perpendicular to the axis as shown in FIG. 30. When the heterogeneous medium lens element is manufactured by the working method for the ordinary lens element described above, the axis may deviate or incline from the center of the outer circumference of the lens element and the lens surface 73 may not be accurately perpendicular to the axis.

A manufacturing method of a heterogeneous lens element which is capable of solving such a problem will be described with reference to the accompanying drawings.

Figure 33:
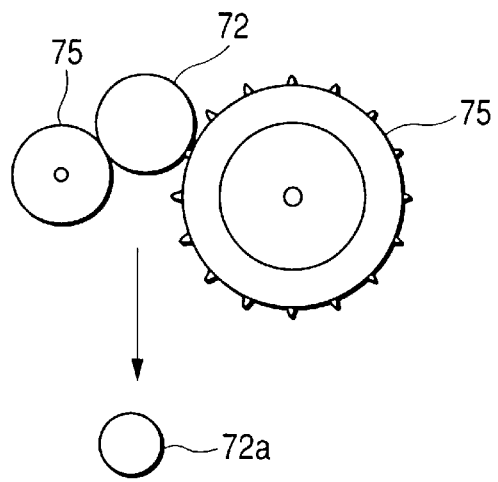
FIG. 33 is a diagram descriptive of a step to grind a heterogeneous medium material with a centerless grinder.

First, description will be made of a manufacturing method of a heterogeneous lens element having a lens surface 73 which is planar. Description will be made on an assumption that the axis is located at the center of the material 72 since an axis is actually coincident with a center of a material which is manufactured by the ion exchange method, sol-gel method or the like. First, the material 72 is cut with a centerless grinder 75 until it has a small diameter so as not to deviate the axis from the center of the material 72 as shown in FIG. 33. A distance between two shafts of the centerless grinder 75 is preliminarily adjusted so that a material 72a which is cut thin will have an outside diameter required for a lens element.

Figure 34:
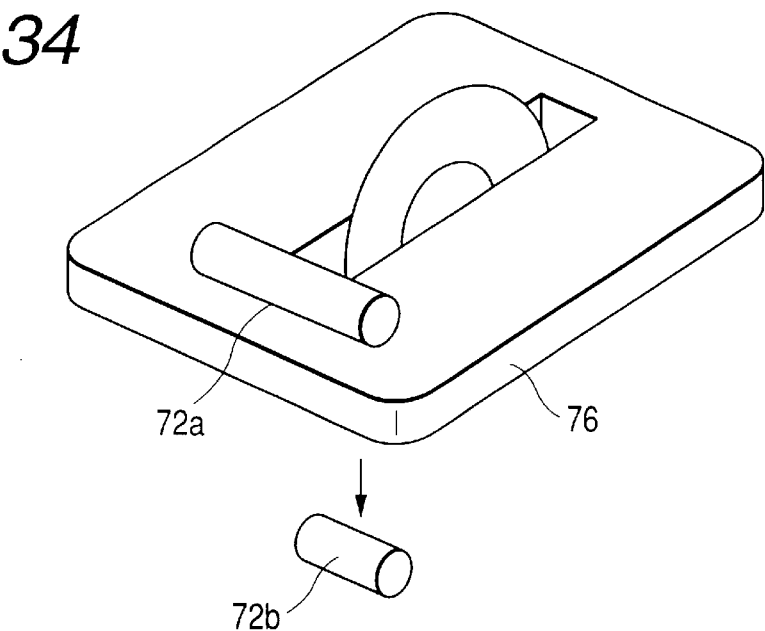
FIG. 34 is a perspective view descriptive of a step to cut the heterogeneous medium material with a cutter.

Then, the material 72a is cut into a material 72b which has a required length including polishing margins with a cutter 76 as shown in FIG. 34. The cut material 72b is thereafter bonded to a side surface of a V-shaped groove of a V block 77 mounted on a flat surface as shown in FIG. 35 so that an axis is perpendicular to the flat surface or to a side surface of a tooth groove of a gear 78 as shown in FIG. 36 so that the axis of the heterogeneous lens element is in parallel with a center axis of the gear 78.

Figure 36:
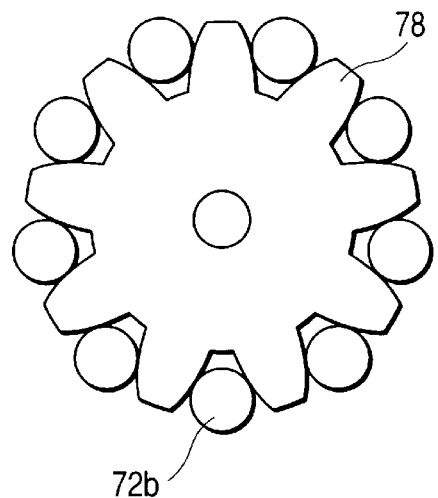
FIG. 36 is a diagram illustrating a condition where the heterogeneous medium material is bonded to a gear.
Figure 37:
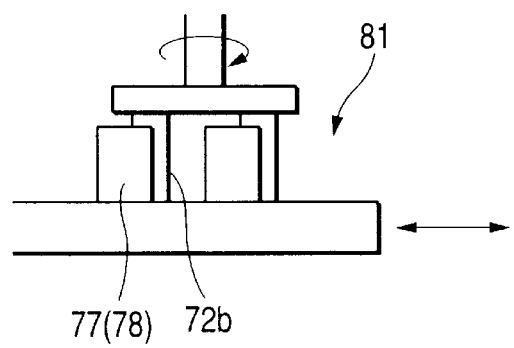
FIG. 37 is a sectional view descriptive of a step to grind the heterogeneous medium material with a surface grinder.
Figure 38:
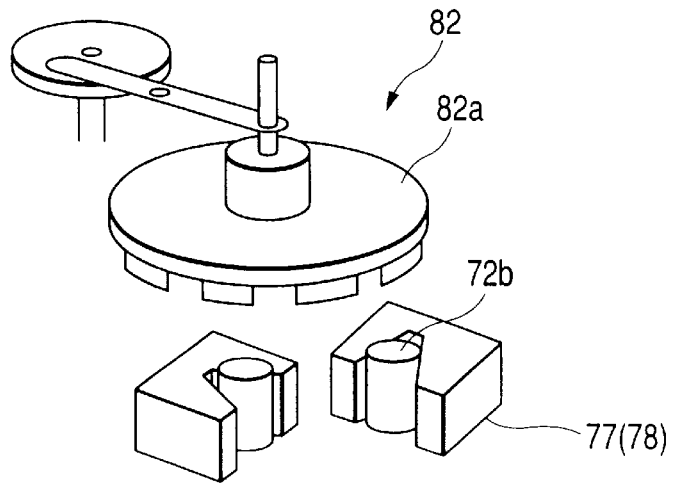
FIG. 38 is a perspective view descriptive of a step to precisely grind and polish the heterogeneous medium material with a polishing machine.

Then, the material 72b which is bonded to the V block 77 or the gear 78 is set on a surface grinder 81 as shown in FIG. 37 and one lens surface of the material 72b is cut with a diamond grind stone so that it is perpendicular to the axis. The lens surface is thereafter cut precisely at several steps with a polishing machine 82 using progressively finer diamond pellets 82a as shown in FIG. 38, and finished into a mirror surface by polishing with $CeO_2$ and water using a urethane sheet, pitch or the like. The other lens surface is also finished into a mirror surface by working it as shown in FIGS. 35 through 38.

Figure 39:
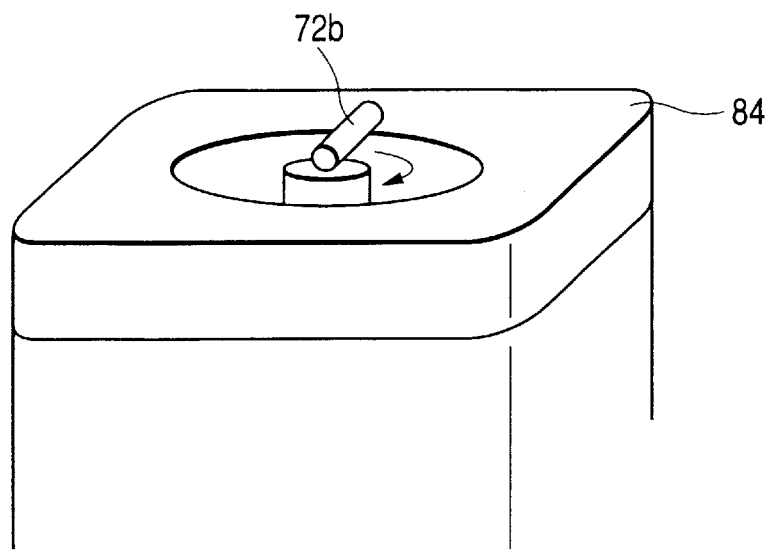
FIG. 39 is a perspective view descriptive of a step to chamfer the heterogeneous medium material with an engine lathe.

After both the lens surfaces are chamfered with an engine lathe 84 or the like as shown in FIG. 39, each of the surfaces is coated with a mono-layer or multi-layer reflection preventive of $MgF_2$ or the similar substance, thereby obtaining a heterogeneous medium lens element which has two planar surfaces.

Figure 35:
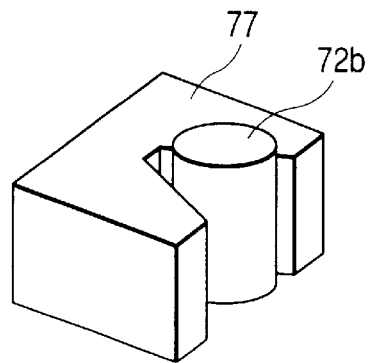
FIG. 35 is a perspective view illustrating a condition where a cut heterogeneous medium material is bonded to a V block.
Figure 40:
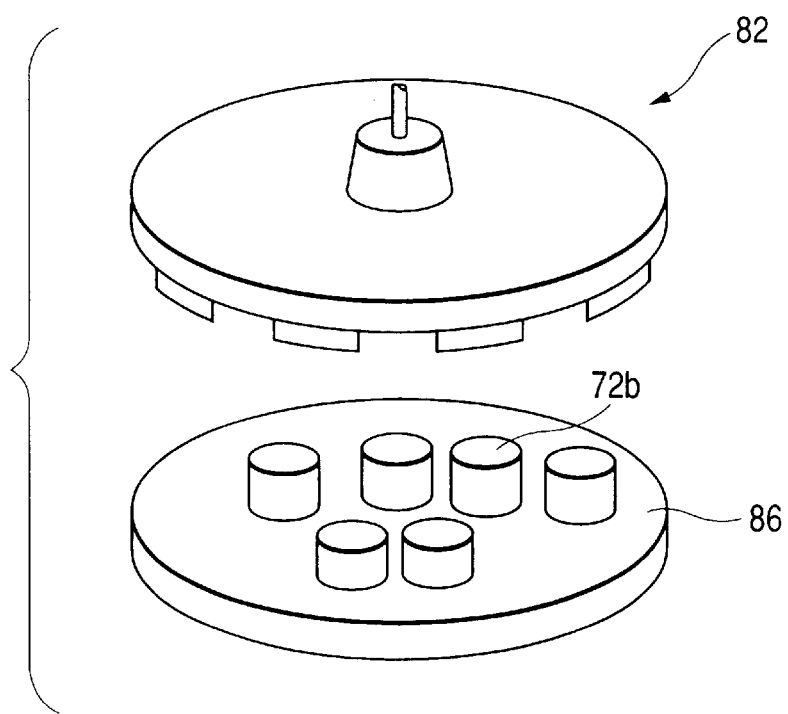
FIG. 40 is a perspective view descriptive of another example of step to precisely grind and polish the heterogeneous medium material with a polishing machine.

When perpendicularity of a cut surface (the lens surface) to the center axis of a refractive index distribution is maintained at the cutting step shown in FIG. 34, it is possible to perform the precise cutting and polishing of the lens surface shown in FIG. 37 and FIG. 38 without bonding the heterogeneous lens element to the V block 77 or the gear 78 as shown in FIG. 35 or 36. After completing polishing of one of the lens surfaces at the step shown in FIG. 38, the polished surface may be butted and bonded to a bonding dish 86 as shown in FIG. 40, and the other lens surface may be precisely cut and polished with the polishing machine 82 in the condition shown in FIG. 40. This practice simplifies the manufacturing steps, thereby providing an advantage from a viewpoint of a manufacturing cost.

Figure 41:
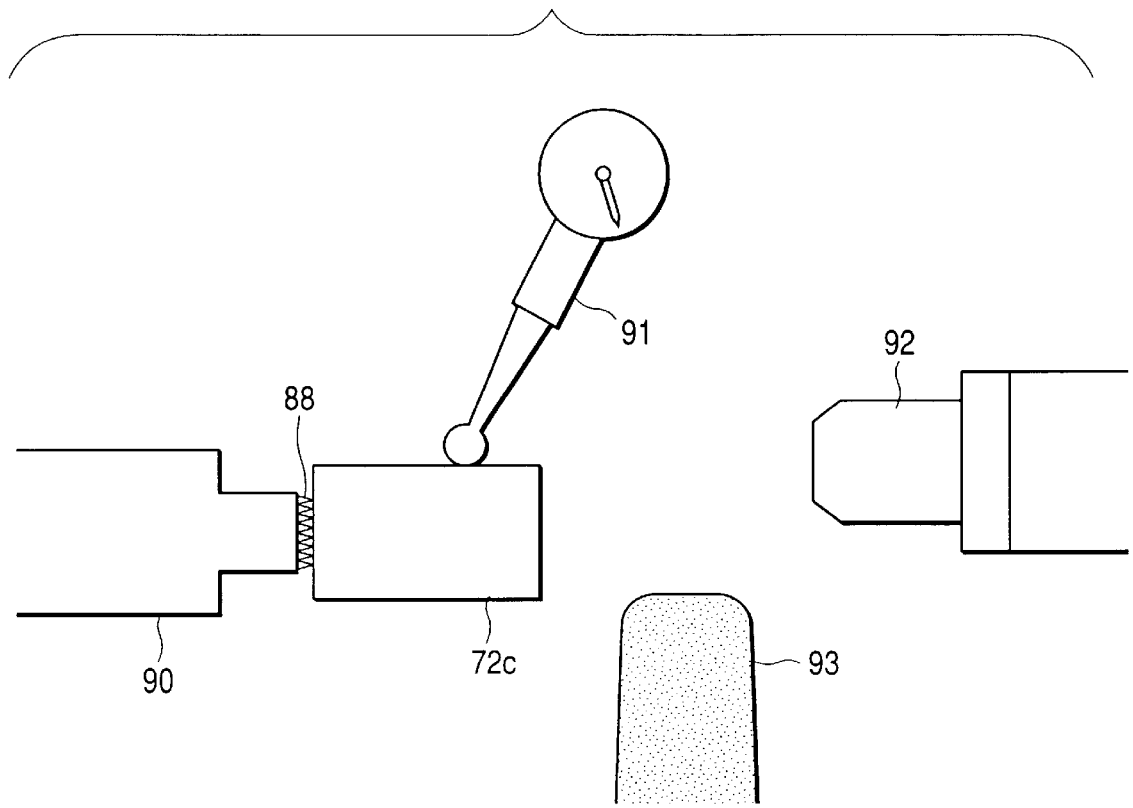
FIG. 41 is a diagram descriptive of a step to grind the heterogeneous medium material with a sider type centering machine.

Another manufacturing method of a heterogeneous medium lens element which has a planar lens surface 73 is to perform the cutting step shown in FIG. 34 without carrying out the outside diameter cutting step shown in FIG. 33, and carry out the steps shown in FIGS. 35 through 38 for both lens surfaces. After completing polishing of the lens surfaces, a material 72c is bonded to a sider type centering machine 90 by way of pitch 88 as shown in FIG. 41. The material 72c is bonded to the sider type centering machine 90 while checking with a pick tester 91 or observing an outer circumference of the material 72c through a microscope 92 so that the material 72c will not be vibrated when the sider type centering machine is rotated. While rotating the sider type centering machine 90 in this condition, the outer circumference of the material 72c is cut with a grind stone 93 until it has an outside diameter of a finished lens element. Then, the surfaces are chamfered with the sider type centering machine 90 and coated with an antireflection film, thereby obtaining a heterogeneous medium lens element which has a center coincident with an axis.

Though description has been made above of the manufacturing methods of a heterogeneous medium lens element which has two planar surfaces, these method are effectively applicable to manufacturing of a heterogeneous medium lens element which has a planar surface and working for uniformalization of outside diameters after lens elements are finished.

Figure 42:
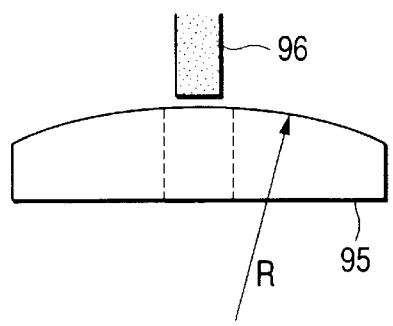
FIG. 42 is a diagram descriptive of a step to form a fixture to be used for manufacturing a heterogeneous medium lens element having spherical surfaces.

Then, description will be made of an example of manufacturing method of a heterogeneous medium lens element which has spherical surfaces having a radius R. First, a lens surface member 95 which has a surface having a radius R is prepared from a glass, metal, resin or other material as shown in FIG. 42. Then, this lens surface member 95 is bonded to a rotating shaft of a sider type centering machine so as to be free from eccentricity. While rotating the rotating shaft, a hole into which a cut heterogeneous medium lens element is to be fitted is formed at a center of the lens surface member 95 with a diamond grind stone 96 and an outer circumference of the lens surface member 95 is chamfered. The lens surface member in which the hole is formed will hereinafter be referred to as a fixture 97.

Figure 43:
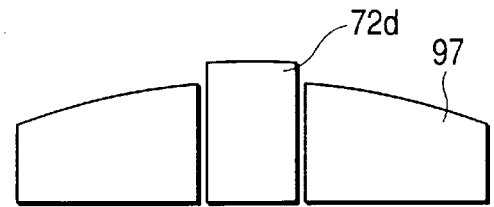
FIG. 43 is a sectional view showing a condition where the heterogeneous medium material is fitted into the fixture.
Figure 44:
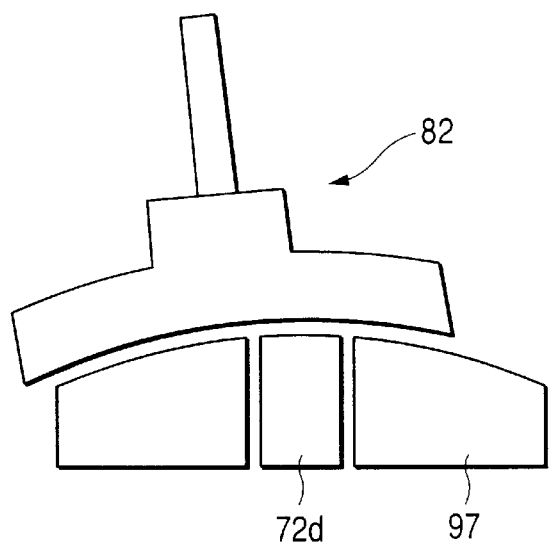
FIG. 44 is a sectional view descriptive of a step to precisely grind and polish the heterogeneous medium material with a polishing machine.

A cut heterogeneous medium lens material 72d is fitted into the hole of the fixture 97 and fixed with plaster or the like as shown in FIG. 43. In this condition, a spherical surface which is not eccentric from an axis of a heterogeneous medium lens element is formed by precisely cutting and polishing the material 72d and the fixture 97 with a polishing machine 82. A heterogeneous medium lens material 72c which is to be fitted into the hole of the fixture 97 can preliminarily be cut with a centerless grinder so that it has a diameter of a finished lens element. Needless to say, the hole of the fixture 97 has in this case an inside diameter which is nearly equal to outer diameter of a finished lens element.

Figure 45:
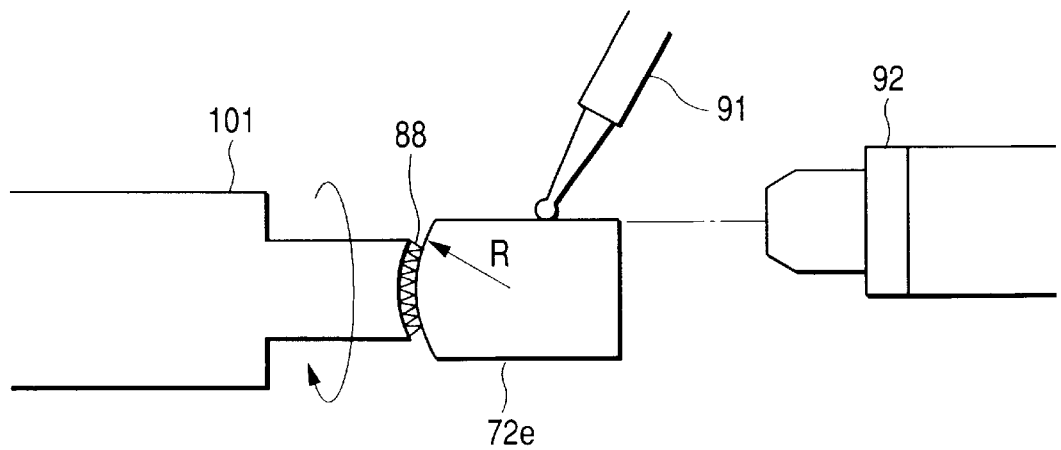
FIG. 45 is a diagram descriptive of a step to bond the heterogeneous medium material to the fixture.

The other surface may be formed into a spherical surface in the similar in the similar procedure. When a lens element is to have a thin marginal portion (a size of an outer circumferential surface in a direction along an optical axis) in particular, the other surface can be formed into a spherical surface in the following procedures. A heterogeneous medium lens material 72e which has a surface polished into a spherical surface is bonded, on a side of the spherical surface, to a fixture 101 which has a concave surface having a radius R by way of a pitch 88 as shown in FIG. 45. While checking with a pick tester 91 or observing an outer circumference of the material 72e through a microscope 92 as described with reference to FIG. 41, the material 72e is bonded so that it will not be vibrated when the fixture 101 is rotated. The fixture 101 has a diameter which is nearly equal to that of a rotating shaft of a curve generator described later or a centering machine so that it can be attached to the curve generator or the centering machine in the condition where the material 72e is bonded thereto. For facilitating the bonding work, it is preferable to select, out of two spherical surfaces to be finally formed, one whichever has a longer radius of curvature as a surface to be bonded to the fixture 101.

Figure 46:
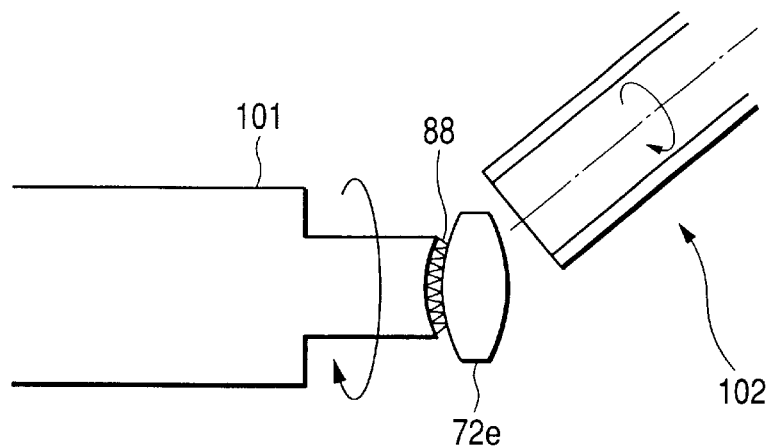
FIG. 46 is a diagram descriptive of a step to grind a curved surface of the heterogeneous medium material with a curve generator.

The fixture 101 is attached to a curve generator 102 as shown in FIG. 46 and the other surface of the material 72e (a right side surface in the drawing) is cut so as to have desired curvature. Then, the fixture 101 is attached to a centering machine and an outer circumference of the material 72e is cut until it has an outside diameter equal to that of a finished lens element. After polishing the other surface of the material 72e into a mirror surface with a polishing machine, both the surfaces are coated as required, thereby obtaining a heterogeneous lens element having two spherical surfaces.

Figure 47:
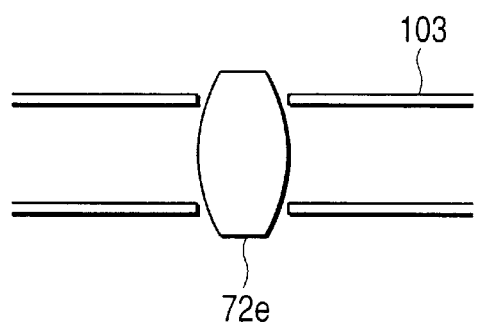
FIG. 47 is a sectional view descriptive of a step to grind an outer circumference of the heterogeneous medium material with a bell clamp centering machine.
Figure 48:
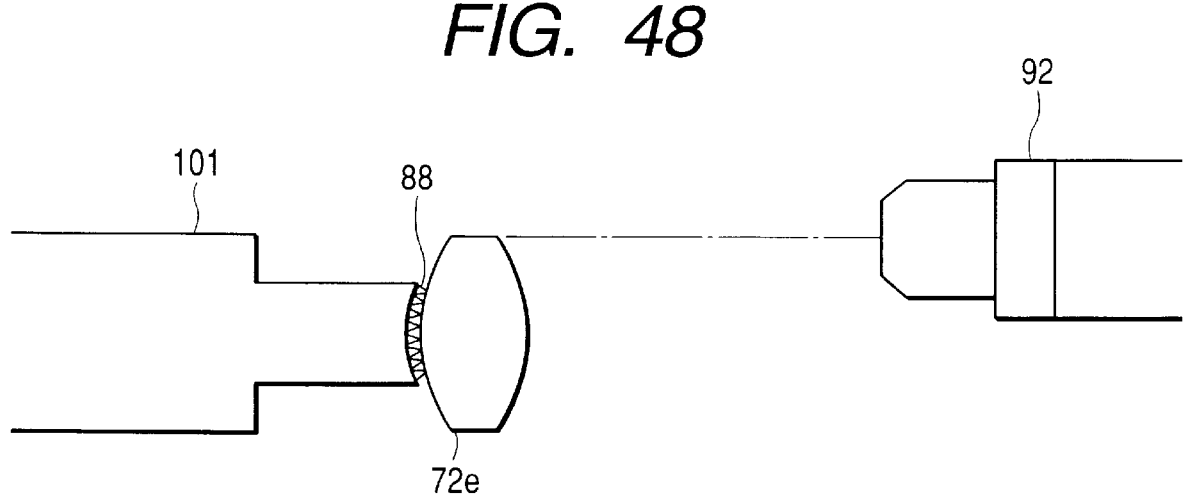
FIG. 48 is a sectional view descriptive of a step to grind the outer circumference of the heterogeneous medium material after both surfaces thereof are ground.

The step to cut the outer circumference of the material 72e with the centering machine may be carried out after the other surface is polished. In this case, the outer circumference of the material 72e may be cut using a bell clamp centering machine 103 as shown in FIG. 47. For polishing the outer circumference of the material 72e after polishing the other surface, the material 72e which has the two polished surfaces may be bonded to the fixture 101 by way of pitch 88 as shown in FIG. 48 and cut with a grind stone while rotating the fixture 101. In this case, the material 72e is bonded to the fixture 101 while observing through a microscope 92 so that it will not be vibrated when the fixture is rotated. Alternately, the outer circumference of the material 72e may be cut without using the microscope 92 but while observing vibrations of a reflected image of the spherical surface (the right side surface in FIG. 48) with an ordinary sider type centering machine.

Figure 49:
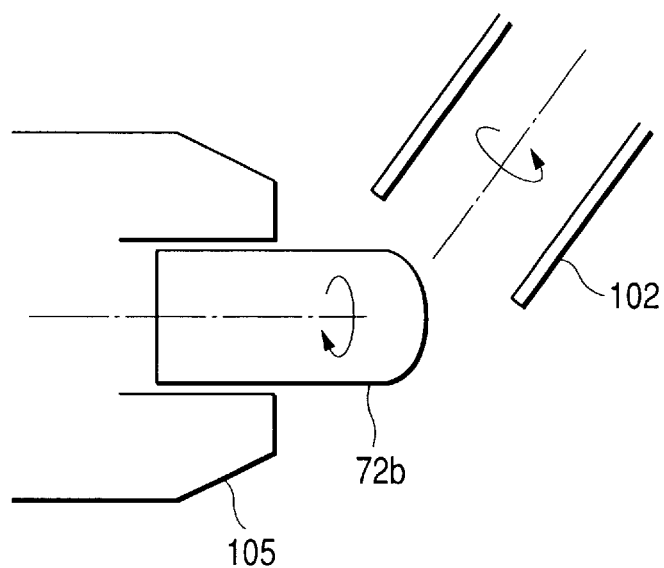
FIG. 49 is a diagram descriptive of a step to grind a surface of the heterogeneous medium material with a curve generator.
Figure 50:
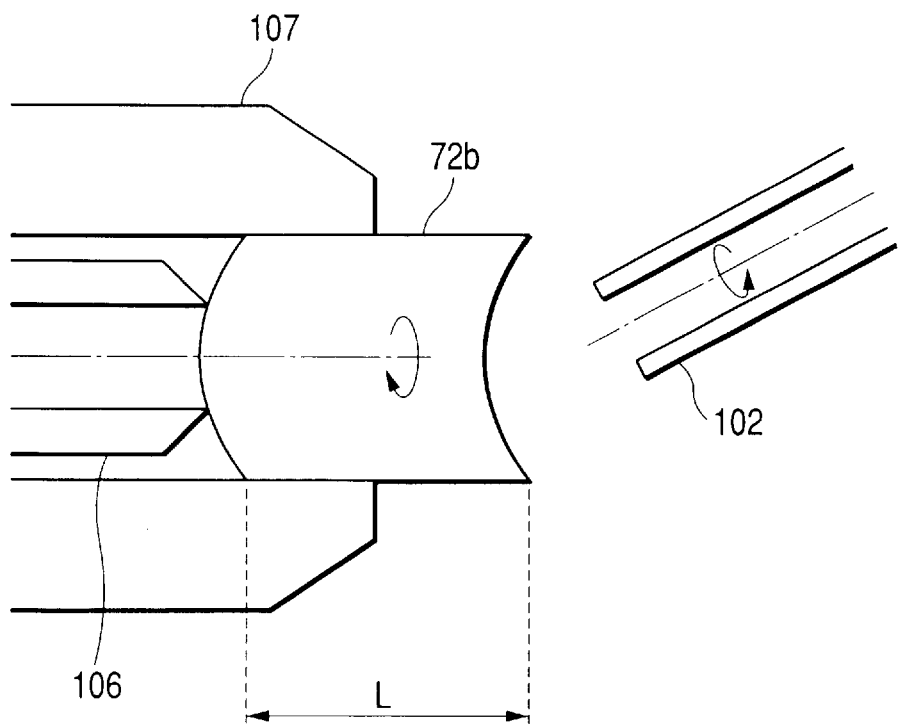
FIG. 50 is a diagram descriptive of a step to grind the other surface of the heterogeneous medium material with a curve generator.

A heterogeneous medium lens element having spherical surfaces, one which has a thick marginal portion, i.e., an outer circumferential surface having a large size in a direction along an optical axis in particular, can be manufactured not only by the methods described above but also a method described below. First, a cut material 72b is fitted into a collect chuck 105 as shown in FIG. 49. After one surface is cut into a desired spherical surface with a curve generator 102, it is precisely cut and then polished with pitch into a mirror surface. Then, the material 72b is fitted into another collect chuck 107 which has a pipe 106 for supporting a spherical surface so that the other surface (a surface which is not polished) of the material 72b is set outside as shown in FIG. 50 and the other surface is cut into a desired spherical surface with the curve generator 102. The pipe 106 is used for obtaining a desired thickness L of a lens element and preventing the spherical surface from being eccentric from an axis of the material 72b. Then, the other surface which is cut into the spherical surface is precisely cut and polished with pitch into a mirror surface. An outer circumference of the material 72b is cut as occasion demands until it has an outside diameter of a finished lens element by any one of the methods described, and then the surfaces are chamfered and coated, thereby obtaining a heterogeneous medium lens element having two spherical surfaces. Though a heterogeneous medium lens element is manufactured by the method described above, a heterogeneous medium lens element which has aspherical surfaces can be manufactured in the similar procedures, according to the present invention.

Now, description will be made of embodiments of the image pickup unit according to the present invention.

Figure 51:
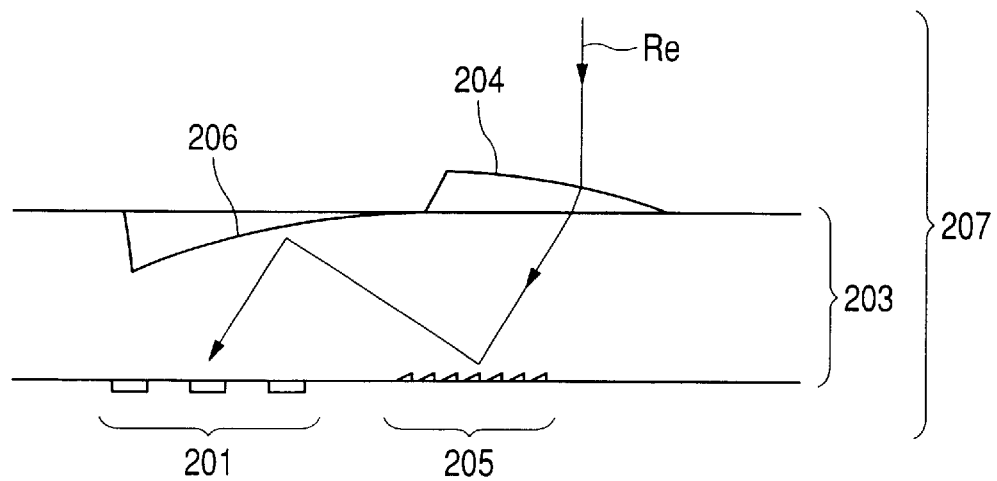
FIG. 51 is a sectional view illustrating a first embodiment of the electronic image pickup unit according to the present invention.
Figure 52:
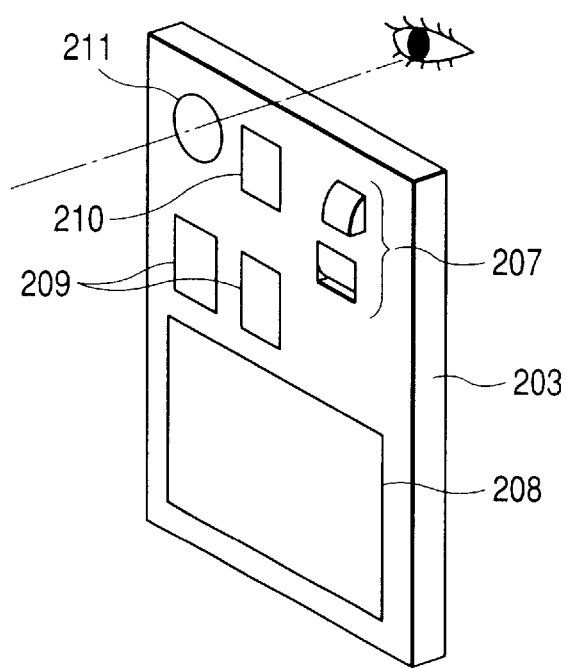
FIG. 52 is a perspective view illustrating a second embodiment of the electronic image pickup unit according to the present invention.

A first embodiment of the image pickup unit according to the present invention is a plate-like image pickup unit 207 which is manufactured by forming, as shown in FIG. 51, free curved surfaces 204, 206 and a diffractive optical element (hereinafter referred to as DOE) 205 as optical elements on both surfaces of a transparent substrate 203 made of a glass, crystal, plastic or another material, and further forming a solid-state image pickup device 201 by using a thin silicon film technique or the like. A free curved surface is a kind of aspherical surface which is not always axially symmetrical but usable as a surface having a refractive or reflective function. In this embodiment, a ray Re coming from an object (not shown) is refracted by the free curved surface 204, deflected and reflected by the offaxis type DOE 205, reflected by the free curved surface 206, and imaged on the solid-state image pickup device 201. Since the free curved surfaces 204, 206 and the DOE 205 correct aberrations, an image which is as favorable as one imaged by an ordinary lens system is incident on the solid-state image pickup device 201. The free curved surfaces 204 and 206 may be formed by molding, and the DOE 205 may be formed by molding or lithography simultaneously with the solid-state image pickup device 201. The solid-state image pickup element 201 may be formed directly on the transparent substrate 203 by lithography. When it is difficult to form the solid-state image pickup element 201 directly on the transparent substrate 203, however, it may be manufactured separately and integrated with the transparent substrate 203 at a subsequent step. A mirror may be disposed on the transparent electrode 203.

Figure 53:
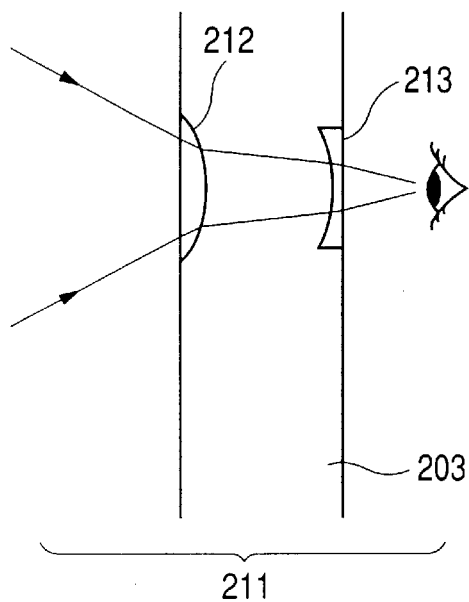
FIG. 53 is a sectional view illustrating a viewfinder section of the second embodiment of the electronic image pickup unit according to the present invention.

A second embodiment of the image pickup unit according to the present invention is a unit for portable information terminal wherein the image pickup unit 207 preferred as the first embodiment is formed on the transparent substrate 203 together with a TFT liquid crystal display 208, IC 209 for a peripheral circuit and a microprocessor 210. The image pickup unit 207 may be formed together with an IC (LSI) which has functions of a memory, telephone and so on. Further, formed on the transparent substrate 203 is a viewfinder 211 for an electronic image pickup unit. This viewfinder may be configured as a simple visual field frame formed on the transparent substrate 203 or a Galilean telescope type viewfinder consisting of a concave lens element 212 and a convex lens element 213 which are disposed on both the surfaces of the transparent substrate 203 as shown in FIG. 53. A view finder may be formed by adding lenses, etc. to the transparent electrode.

Figure 54:
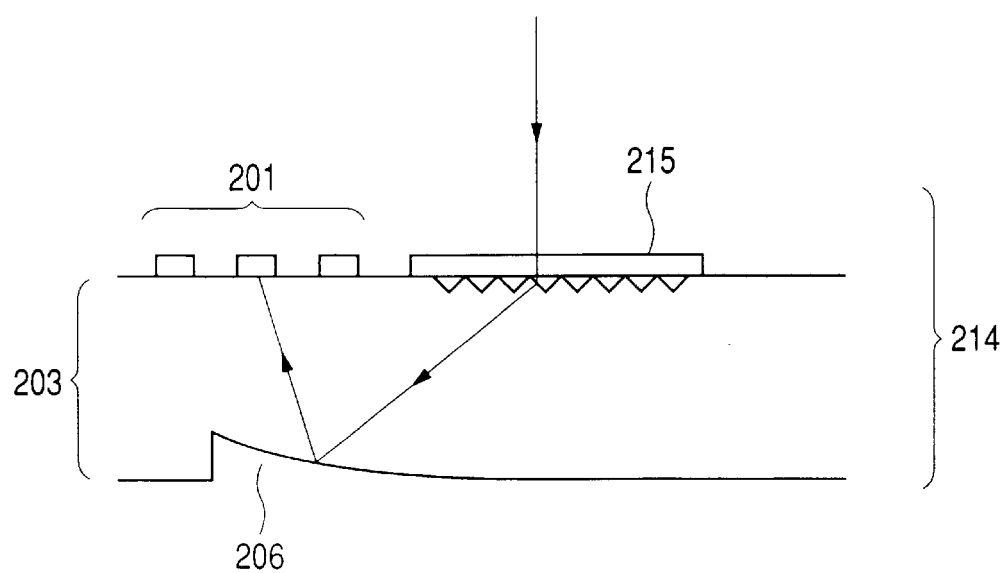
FIG. 54 is a sectional view illustrating a third embodiment of the electronic image pickup unit according to the present invention.
Figure 55:
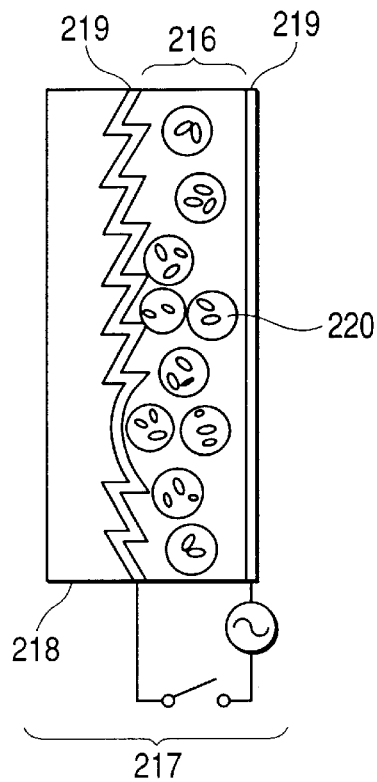
FIG. 55 is a sectional view illustrating an optical element to be used in the third embodiment of the electronic image pickup unit according to the present invention.
Figure 56:
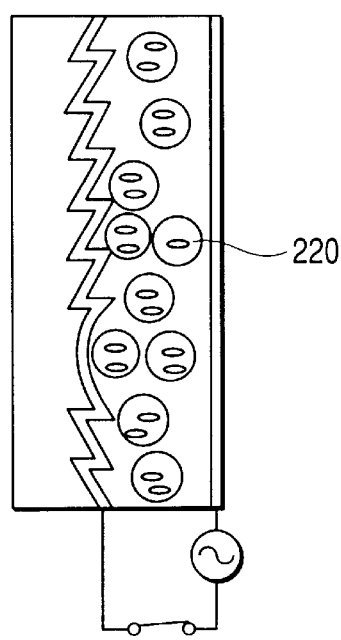
FIG. 56 is a sectional view illustrating a condition of liquid crystal molecules when an electric field is applied to a liquid crystal layer of an optical element.
Figure 57:
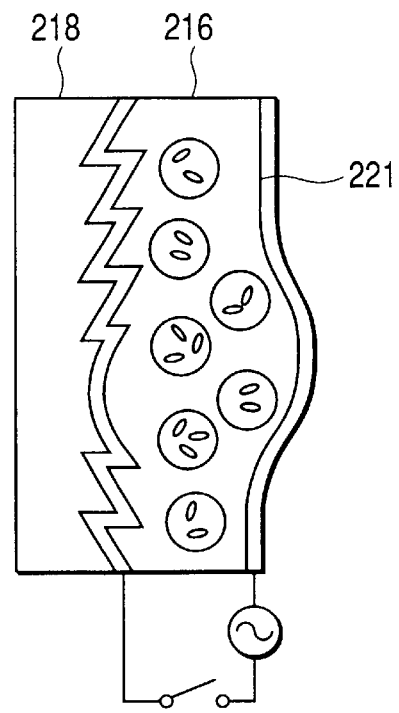
FIG. 57 is a sectional view illustrating a modification example of the optical element to be used in the electronic image pickup unit according to the present invention.
Figure 61:
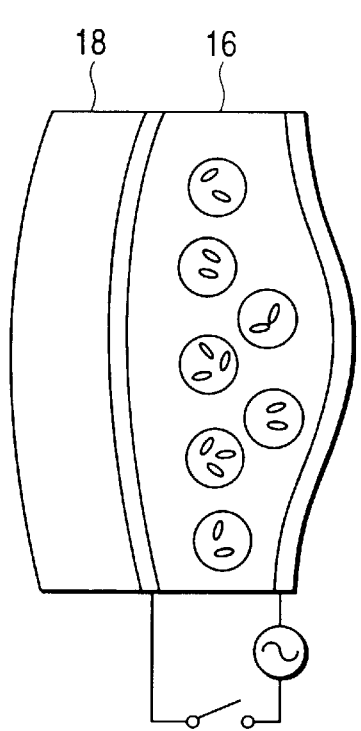
FIG. 61 is a sectional view illustrating another modification example of the optical element to be used in the third embodiment of the electronic image pickup unit according to the present invention.

A third embodiment of the image pickup unit according to the present invention is a plate-like image pickup unit 214 which is configured so as to be capable of adjusting a focal point as shown in FIG. 54. For adjusting a focal point with the plate-like image pickup unit 214, it is impossible to mechanically move the DOE 205, the free curved surface 206 and so on shown in FIG. 51. Therefore, the plate-like image pickup unit 214 preferred as the third embodiment uses an optical element 215 which has a variable optical characteristic. FIG. 55 shows an example of the optical element 215 which has a vari-focal DOE 217 using a polymer dispersive liquid crystal 216. Grooves on the order of wavelengths of rays are formed in at least one of surfaces of a transparent substrate 218 so that liquid crystal molecules 220 are oriented as shown in FIG. 56 by applying a voltage to a transparent substrate 219, thereby lowering a refractive index of the polymer dispersive liquid crystal 216. When a voltage is not applied, on the other hand, the liquid crystal molecules 220 are directed at random, whereby the refractive index of the polymer dispersive liquid crystal 216 is enhanced. Accordingly, the vari-focal DOE 217 is capable of changing a focal length dependently on whether or not a voltage is applied. When a weight ratio of the liquid crystal molecules 220 is enhanced until it exceeds a certain level (for example, not lower than 25%) the polymer dispersive liquid crystal 216 is nearly solid, thereby making it unnecessary to dispose a substrate on the right side of the polymer dispersive liquid crystal 216. Further, a right side surface of the polymer dispersive liquid crystal 216 and a left side surface of the transparent substrate 218 may be configured as curved surfaces 221 so as to have a function of a lens and a function to correct aberrations. In each of the examples shown in FIGS. 55 and 57, a right side surface of the transparent substrate 218 may be configured not as a DOE surface but as a Fresnel surface. In this case, the DOE 217 functions as a vari-focal Fresnel lens element. Further, the right side surface of the transparent substrate 218 may be configured as a curved surface like a surface of an ordinary lens element as shown in FIG. 61.

Furthermore, the transparent substrates 203 and 218 may be configured so as to exhibit effects of infrared cut filters.

Figure 58:
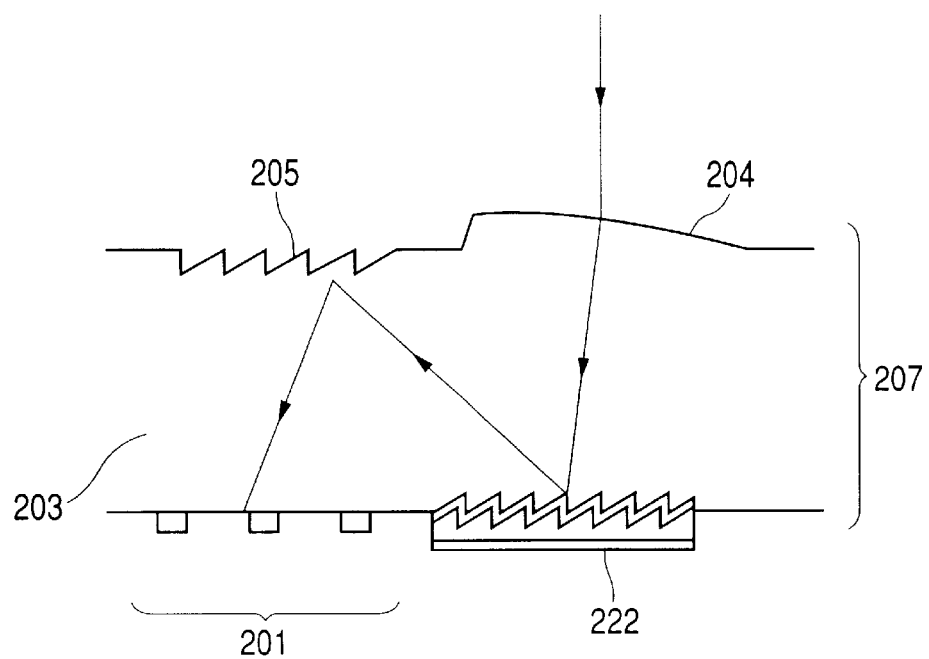
FIG. 58 is a sectional view illustrating a fourth embodiment of the electronic image pickup unit according to the present invention.
Figure 59:
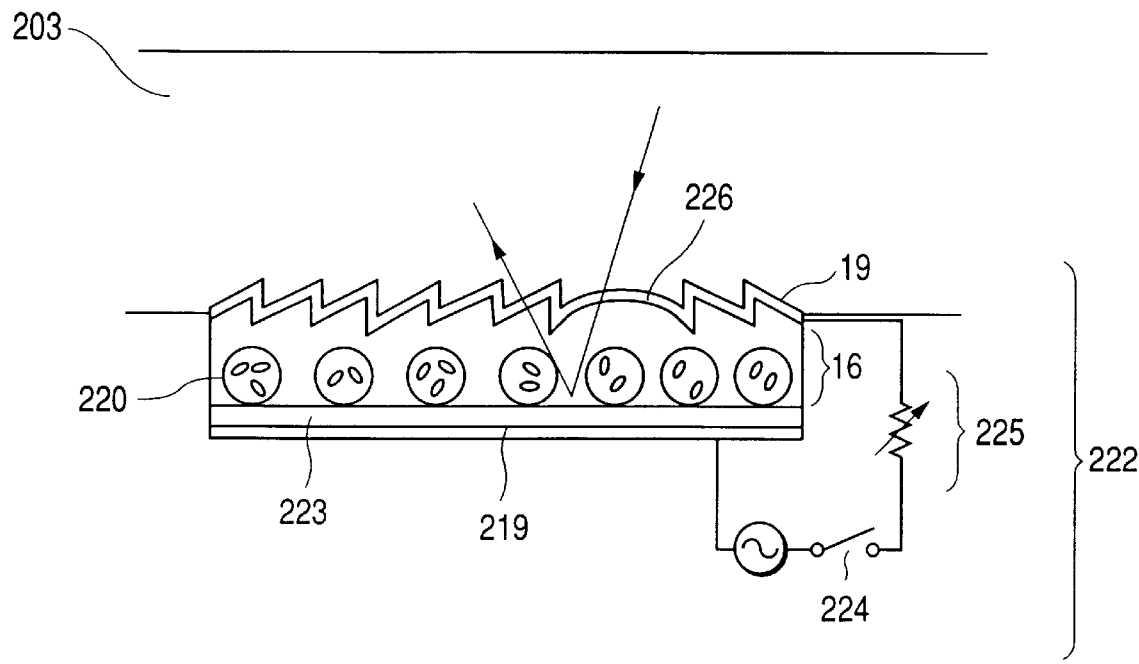
FIG. 59 is a sectional view illustrating a vari-focal Fresnel mirror to be used in the fourth embodiment of the electronic image pickup unit according to the present invention.

A fourth embodiment of the image pickup unit according to the present invention is a plate-like image pickup unit which uses a reflection type vari-focal Fresnel mirror 222 as shown in FIG. 58. The Fresnel mirror 222 functions as a vari-focal Fresnel mirror since a reflecting surface 223 is disposed as shown in FIG. 59 and a refractive power of a Fresnel surface 226 is changed when a voltage is varied by turning on/off a switch 224 or with a variable resistor 225. A DOE may be used in place of the Fresnel surface 226.

Figure 60:
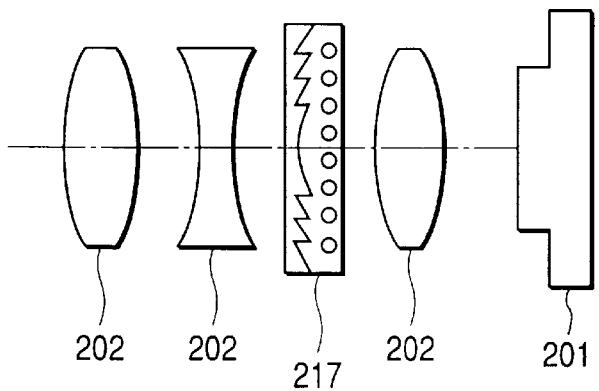
FIG. 60 is a sectional view exemplifying application of a vari-focal diffractive optical element.

A vari-focal DOE 217 and the Fresnel mirror 222 adopted for the fourth embodiment described above can be used not only in the plate-like image pickup unit 207 but also in ordinary image pickup units, vari-focal lens elements for optical disks having different thicknesses, electronic endoscopes, TV cameras, film cameras and so on as shown in FIG. 60. For changing focal length more speedily, it is more preferable to use tolane series liquid crystals, for example DON-605: N-1 prepared by Dainihon Ink, Co., Ltd. (Monthly Report of Japanese Chemical Association. February 1997, p14 through p18) which has a high optical anisotropy ($\Delta n=0.283$; $\Delta n$ represents an optical anisotropy which is a difference between principal axes of optical indicatrices) and a low viscosity. Such a liquid crystal permits changing a refractive index speedily, thereby making it possible to obtain optical elements having optical characteristics which can be varied at higher response.

In the foregoing description, an intensity of a magnetic field is changed mainly for varying an orientation of a liquid crystal. However, this method is not limitative and an orientation of a liquid crystal may be varied by changing a frequency of an electric field. Further, an orientation of a liquid crystal may be varied by changing an intensity or a frequency of a magnetic field.

When an orientation of a liquid crystal is changed by varying a frequency of an electric field using a liquid crystal having a dielectric anisotropy whose sign is changed by varying a frequency in particular, it is possible to change a refractive index speedily, thereby obtaining an optical element which is capable of varying an optical characteristic at high response.

Further, the following fact is applicable to all the optical elements having variable optical characteristics according to the present invention.

A substance having a refractive index which can be changed by varying an electric field, a magnetic field, a temperature or the like can be used in place of a liquid crystal. In other words, it is possible to form an optical element having a variable optical characteristic by using a material of polymers in which a substance having a variable refractive index is dispersed. It is also preferable that an optical element having a variable optical characteristic also satisfies any one, a combination of certain ones or all of the conditions (18), (18-5), (19), (19-5), (1-1) and (1).

$BaTiO_2$ is known as an example of substance which has a refractive index changed by applying an electric field, lead glass and quartz are known as examples of substances which have refractive indices changed by applying a magnetic field, and water and the like are known as examples of substances which have refractive indices changed by varying a temperature.

What is claimed is:

1. Vari-focal spectacles comprising: a lens unit configured so that a lens element for spectacles has a plurality of areas at least one of which has a vari-focal function; and a support member for setting at least said lens unit before an observer's eyeballs so as to permit saving a trouble of exchanging a plurality of spectacles by changing a focal length of at least an area of said lens unit, wherein said lens element has at least an area having a fixed focal length and said plurality of areas having a fixed focal length are formed within a range of a surface of said lens element.

2. The vari-focal spectacles according to claim 1, wherein said lens unit has the area having the vari-focal function at least below a center of said lens unit.

3. The vari-focal spectacles according to claim 1, wherein said lens unit has an area having a fixed focal point at least above a center of said lens unit.

4. The vari-focal spectacles according to claim 1, wherein said area are having the vari-focal function disposed in said lens unit is configured so as to contain a refractive index variable substance.

5. The vari-focal spectacles according to claim 4, wherein said refractive index variable substance is configured in a periodically arranged condition.

6. The vari-focal spectacles according to claim 1, wherein said area having the vari-focal function disposed in said lens unit is configured so as to contain a liquid crystal substance.

7. The vari-focal spectacles according to claim 1, wherein said area having the vari-focal function disposed in said lens unit is configured so as to contain a liquid crystal substance and a diffractive optical element.

8. The vari-focal spectacles according to claim 1, wherein said area having the vari-focal function is configured so as to contain a liquid crystal substance and a polymer substance.

9. The vari-focal spectacles according to claim 1, wherein a partial area of said lens unit having the vari-focal function consists of liquid crystal elements which are arranged in a spiral form satisfying the following condition:

$$2 \text{ nm} \leq P \leq 40\lambda$$

wherein the reference symbols P represents a spiral pitch of molecules in said liquid crystal element and the reference symbol $\lambda$ represents a wave length of rays in the twist nomatic condition of said liquid crystal element.

10. A lens unit configured so that a lens element for spectacles has a plurality of areas at least one of which has a vari-focal function, wherein said lens element has at least an area having a fixed focal length and said plurality of areas having a fixed focal length are formed within a range of a surface of said lens element.

11. The lens unit according to claim 10, wherein said lens unit has an area having said vari-focal function at least below a center of said lens unit.

12. The lens unit according to claim 11, wherein said lens unit has an area having a fixed focal point at least above center of said lens unit.

13. The lens unit according to claim 11, wherein said area having the vari-focal function disposed on said lens unit is configured so as to contain a refractive index variable substance.

14. The lens unit according to claim 11, wherein said area having the vari-focal function disposed in said lens unit is configured so as to contain a liquid crystal substance.

15. The lens unit according to claim 11, wherein said area having the vari-focal function disposed in said lens unit is configured so as to contain a liquid crystal substance and a diffractive optical element.

16. The lens unit according to claim 11, wherein said area having the vari-focal function disposed in said lens unit is configured so as to contain a liquid crystal substance and a polymer.

17. The lens unit according to claim 11, wherein a refractive index variable substance contained in said area having the vari-focal function is configured in a periodically arranged condition.

18. A vari-focal lens comprising:

a lens unit having a lens element; and a support member for setting said lens unit before observer's eyeballs, wherein said lens element has a plurality of areas within a range of a surface including at least an area having a variable focal length and at least an area having a fixed focal point.

* * * * *